US008661483B2

(12) United States Patent
Lucas

(10) Patent No.: US 8,661,483 B2
(45) Date of Patent: *Feb. 25, 2014

(54) DETERMINATION OF RECEIVING LIVE VERSUS TIME-SHIFTED MEDIA CONTENT AT A COMMUNICATION DEVICE

(71) Applicant: Sling Media, Inc., Foster City, CA (US)

(72) Inventor: Brian Lucas, San Francisco, CA (US)

(73) Assignee: Sling Media, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/690,943

(22) Filed: Nov. 30, 2012

(65) Prior Publication Data

US 2013/0167189 A1 Jun. 27, 2013

Related U.S. Application Data

(63) Continuation of application No. 12/606,734, filed on Oct. 27, 2009, now Pat. No. 8,327,407.

(51) Int. Cl.
*H04N 7/173* (2011.01)

(52) U.S. Cl.
USPC .................. 725/94; 725/87; 725/88; 725/110

(58) Field of Classification Search
None
See application file for complete search history.

(56) References Cited

U.S. PATENT DOCUMENTS 6,295,092 B1 9/2001 Hullinger et al.
6,642,939 B1 11/2003 Vallone et al.
6,868,447 B1 3/2005 Slaughter et al.
7,113,972 B2 9/2006 Yoshi et al.
7,225,142 B1 5/2007 Apte et al.
7,313,809 B1 12/2007 Mohan et al.
7,339,992 B2 3/2008 Chang et al.
7,707,614 B2 4/2010 Krikorian et al.
7,749,756 B2 7/2010 Leonhartsberger et al.
7,769,756 B2 8/2010 Krikorian et al.
7,877,776 B2 1/2011 Krikorian et al.
8,060,609 B2 11/2011 Banger et al.
8,327,407 B2 12/2012 Lucas
2003/0017003 A1 1/2003 Ragsdale
2003/0229528 A1 12/2003 Nitao et al.
2004/0158856 A1 8/2004 Grooters et al.
2005/0071219 A1 3/2005 Kahlert et al.
2005/0204046 A1 9/2005 Watanabe
2006/0015903 A1 1/2006 MacBeth et al.
2006/0059260 A1 3/2006 Kelly et al.
2006/0075457 A1 4/2006 Kim
2006/0095401 A1 5/2006 Krikorian et al.

(Continued)

OTHER PUBLICATIONS

USPTO "Non-Final Office Action" mailed Mar. 29, 2012 for U.S. Appl. No. 13/295,873, filed Nov. 14, 2011.

(Continued)

*Primary Examiner* — Brian Pendleton
*Assistant Examiner* — Fernando Alcon
(74) *Attorney, Agent, or Firm* — Ingrassia Fisher & Lorenz, P.C.

(57) ABSTRACT

A method of determining whether live media content or time-shifted media content is received at a computing device such as a server or media player is presented. Attribute information concerning media content received at a communication device at a specific time is received and compared schedule information. The received media content is determined to be live media content if the media content identity agrees with the schedule information. The received media content is determined to be time-shifted media content if the media content identity does not agree with the schedule information.

20 Claims, 16 Drawing Sheets

(56) References Cited

U.S. PATENT DOCUMENTS

| | | | |
|---|---|---|---|
| 2007/0078712 | A1 | 4/2007 | Ott et al. |
| 2007/0104367 | A1 | 5/2007 | Nankai et al. |
| 2007/0168543 | A1 | 7/2007 | Krikorian et al. |
| 2008/0098300 | A1 | 4/2008 | Corrales et al. |
| 2008/0276289 | A1 | 11/2008 | Stephanus van Ottele |
| 2009/0106393 | A1 | 4/2009 | Parr et al. |
| 2009/0300673 | A1 | 12/2009 | Bachet et al. |
| 2010/0040345 | A1 | 2/2010 | Beach et al. |
| 2011/0294483 | A1 | 12/2011 | Sathish |

OTHER PUBLICATIONS

USPTO "Final Office Action" mailed Nov. 8, 2011 for U.S. Appl. No. 13/295,873, filed Nov. 14, 2011.

USPTO, Notice of Allowance, dated Apr. 26, 2013 for U.S. Appl. No. 13/295,873.

DETERMINATION OF RECEIVING LIVE VERSUS TIME-SHIFTED MEDIA CONTENT AT A COMMUNICATION DEVICE

BACKGROUND

Video place-shifting devices, including the Slingbox® by Sling Media Inc., allow users to access a video content source, such as a satellite or cable television set-top box, standalone digital video recorder (DVR), or digital video disc (DVD) player, from a remote location. For example, a user on a business trip far from home may use a desktop or laptop computer, cellular phone, personal digital assistant (PDA), or other communication device to communicate by way of the Internet, cellular network, or other communication network with a place-shifting device attached to a television set-top box located in the user's home. Through this communication, the user may control the set-top box to perform a variety of functions, including setting recording timers for an internal DVR, viewing audio/video programming being received live at the set-top box, and viewing programs previously recorded on the set-top box DVR. To view this programming, the set-top box transfers the programming over the communication network to the communication device, which presents the programming to the user by way of an output display, such as a computer screen.

In some cases, knowing whether a user is watching live or previously-recorded programming may provide desirable information regarding a user's viewing habits, the user's operation of the communication device, and other areas of interest. However, in the above example, since all programming viewed at the communication device is transmitted over the same communication network from the set-top box, determining whether a user is viewing live or recorded programming at any particular time may be problematic.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
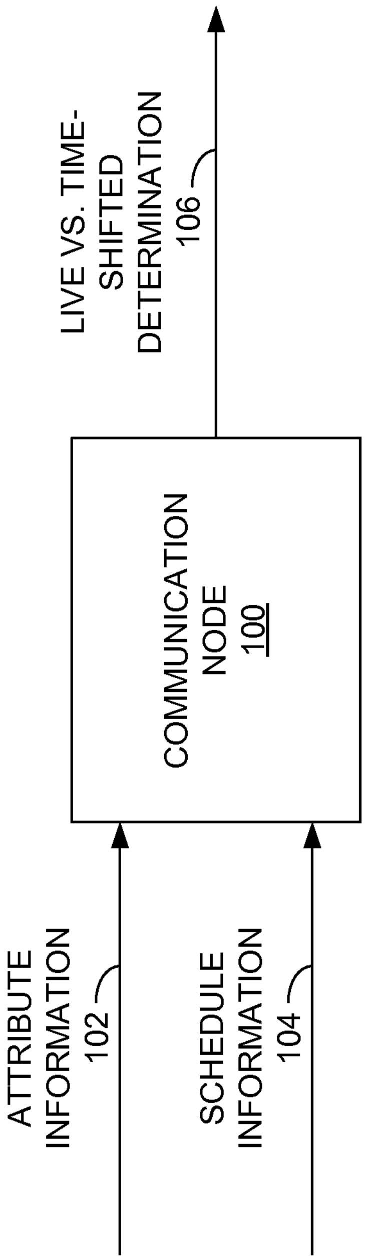
FIG. 1 is a block diagram of a communication node according to an embodiment of the invention.

FIG. 1 provides a block diagram of a communication node 100 according to an embodiment of the invention. In one example, the communication node 100 is a component of a larger media content system in which media content is captured and transmitted over a communication link to a communication device configured to present the media content to a user. In one embodiment, the communication node 100 is communicatively coupled with the communication device, as well as a communication component configured to transmit the media content to the communication device. In other examples, the communication node 100 may be the communication device, the transmitting communication component, or both. Further, the communication node 100 may be one or more separate devices working cooperatively.

The media content being received may be any type of content of interest to a user. Examples include audio and/or visual content, such audio/video programs broadcast or otherwise distributed by way of a terrestrial ("over-the-air"), cable, satellite, or Internet television network. Other types of media content include, but are not limited to, video-only content, audio-only content (such as terrestrial or satellite radio) and textual content.

Figure 2:
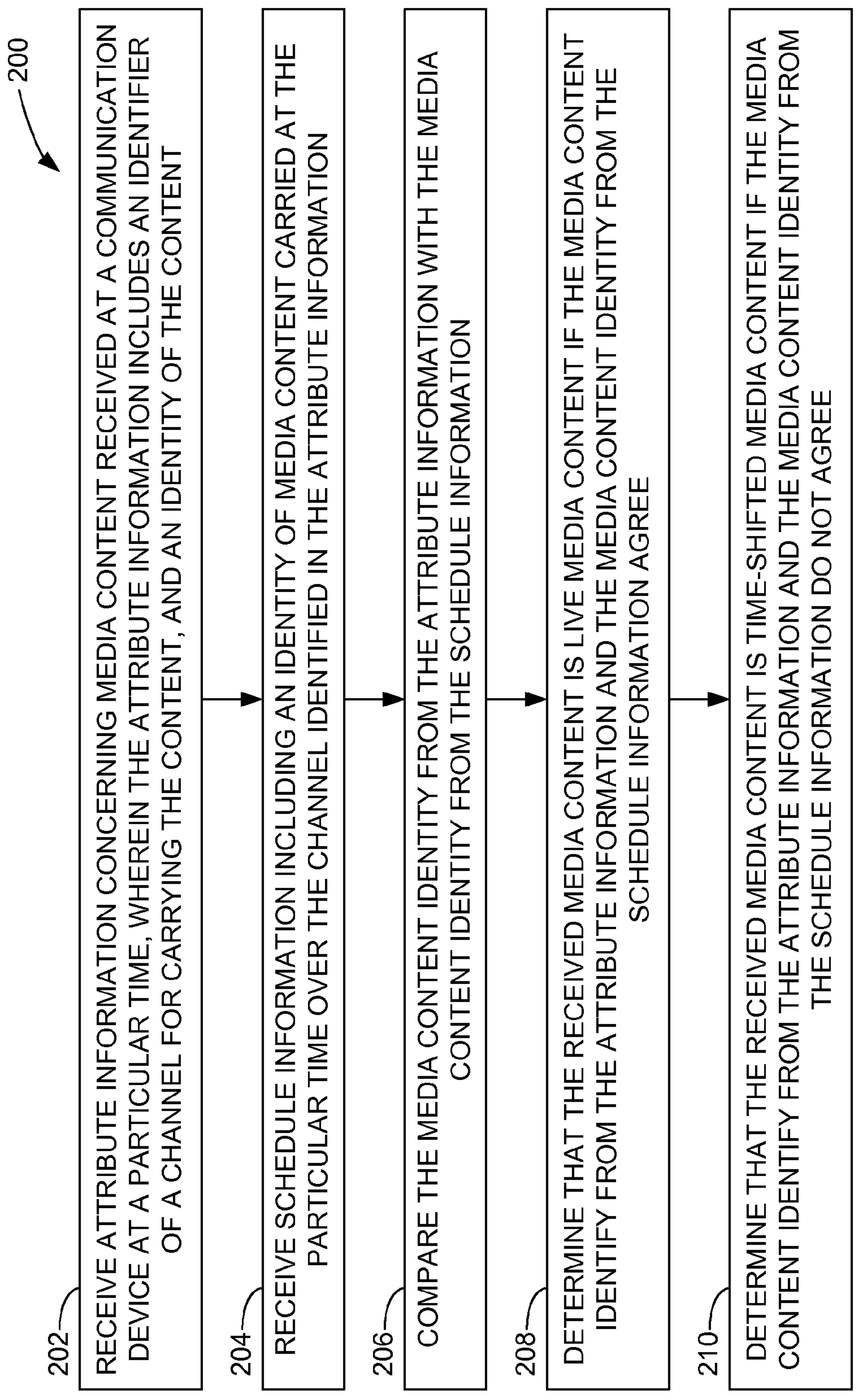
FIG. 2 is a flow diagram of a method according to an embodiment of the invention for determining whether live media content or time-shifted media content is received at a communication device.

FIG. 2 is a flow diagram of a method 200 for determining whether live media content or time-shifted content is received at a communication device. While the method 200 is discussed below in conjunction with the environment of the communication node 100 shown in FIG. 1, the method 200 may be utilized with other devices not explicitly discussed herein.

In the method 200, the communication node 100 receives attribute information 102 concerning media content received at a communication device at a specific time (operation 202). The attribute information 102 includes an identifier of a channel for carrying the received media content, and an identity of the received media content. The communication node 100 also receives schedule information 104 including an identity of media content carried at the specific time over the channel identified in the attribute information (operation 204). The node 100 compares the media content identity from the attribute information 102 with the media content identity from the schedule information 104 (operation 206). If the media content identity from the attribute information 102 and the media content identity from the schedule information 104 agree (operation 206), the node 100 determines that the received media content is live media content (operation 208). Otherwise, the node 100 determines that the received media content is time-shifted media content (operation 210). In another embodiment, a computer-readable storage medium may have encoded thereon instructions for at least one processor or other control circuitry of the communication node 100 of FIG. 1 to implement the method 200.

Depending on the implementation, either or both of the attribute information 102 and the schedule information 104 may be received from a source external to the communication node 100, as shown in FIG. 1, or generated within the node 100. Similarly, the determination 106 as to whether the received media content is live or time-shifted may be transferred to another component external to the communication node 100, or consumed internally within the node 100 for a subsequent operation or purpose.

As a result of at least some embodiments of the method 200, the communication node 100 may determine whether a communication device receiving media content remotely from a media source via a communication link is receiving that content "live" (e.g., while being broadcast) or in a time-delayed manner (e.g., replayed from a recording on a storage medium, such as a DVR). The node 100 or another device may then employ such information to perform other functions, including, but not limited to, providing media content recommendations to a user of the receiving communication device, adjusting transmission of subsequent media content from the media content source, and controlling subsequent transmission of the received media content. Other advantages may be recognized from the various implementations of the invention discussed in greater detail below.

Figure 3:
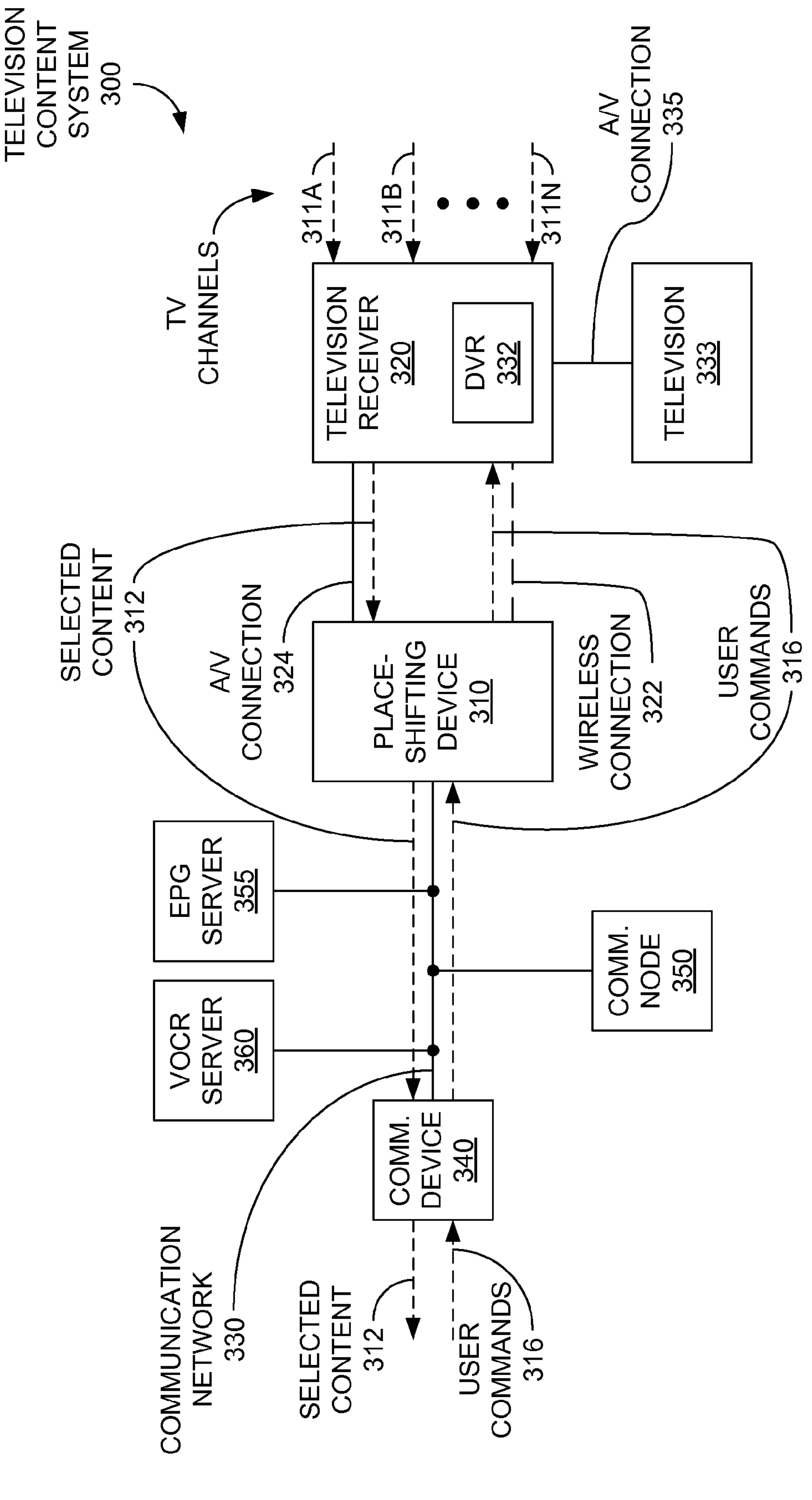
FIG. 3 is a block diagram of a television content system according to an embodiment of the invention.

FIG. 3 is a block diagram of a television content system 300 according to an embodiment of the invention. The television content system 300 includes a communication device 340, a communication node 350, a place-shifting device 310, and a television receiver 320 coupled together via a communication network 330. Coupled with the receiver 320 may be a television 333. Also included in some implementations of the television content system 300 are an electronic program guide (EPG) server 355 and a video optical character recognition (video OCR, or VOCR) server 360. Generally, the communication node 350 represents an example of the communication node 100 of FIG. 1.

Typically, the television receiver 320 provides one of a number of television channels 311A, 311B, . . . , 311N, as selected by a user of a closely-located television 333, to the television 333 over an audio/video connection 335 for viewing. Examples of the television receiver 320 may include, but are not limited to, a satellite, cable, or terrestrial ("over-the-air") set-top box, and a standalone DVR unit. As a result, the television receiver 320 may provide television programming from at least one audio/video source, such as a satellite in geosynchronous orbit, a coaxial cable head-end, or a terrestrial antenna. In the example of FIG. 3, the television receiver 320 includes a DVR unit 332 so that programs received over one or more of the television channels 311 may be recorded on the DVR 332 for viewing at some point in the future.

The place-shifting device 310 of FIG. 3 facilitates communication between the television receiver 320 and the communication device 340. More specifically, the place-shifting device 310 may receive user commands 316 from the communication device 340 via the communication network 330 to perform various operations, including selecting one of the television channels 311 for viewing selected media content 312. Further, the place-shifting device 310 may be coupled with the television receiver 320 by way of another audio/video connection 324 so that selected media content 312 captured by way of the receiver 320 may be forwarded to the communication device 340 over the communication network 330. In another example, the place-shifting device 310 may provide an audio/video output (not shown in FIG. 3) to pass audio/video programming received from the television receiver 320 to the television 333. Such an arrangement may be advantageous if the receiver 320 only provides a single audio/video output connection 324.

In other arrangements, the place-shifting device 310 may incorporate the functionality of the television receiver 320, or vice-versa, thus allowing a single device to receive the multiple channels 311 of television programming, select one of the channels 311 under the direction of the user of the communication device 340, and transfer the content 312 of the selected channel 311 over the communication network 330 to the communication device 340.

To allow the user of the communication device 340 to control the television receiver 320, the place-shifting device 310, such as one of several models of Slingbox® provided by Sling Media Inc., may also produce infrared remote control signals over a wireless connection 322 so that the place-shifting device 310 may transmit the user commands 316 received over the communication network 330 to the receiver 320 by way of an infrared remote control device input of the receiver 320. Generally, these commands are the same as those transmitted by a remote control device that is normally supplied to the user with the receiver 320. Thus, the place-shifting device 310 operates as a sort of remote control emulator under the control of the communication device 340. In other examples, other forms of remote control signals, such as radio frequency (RF) signals or acoustic signals, may be employed in other implementations.

In addition, other devices not shown in FIG. 3 that act as sources of television programming may be coupled with the place-shifting device 310 for ultimate transmission of the programming to the communication device 340. These devices may include, but are not limited to, DVD players or jukeboxes, game consoles, music servers, satellite radio receivers, camcorders, and video cassette recorders (VCRs).

In FIG. 3, the communication device 340 may be any device capable of communicating with the place-shifting device 310 over the communication network 330, including, but not limited to, desktop or laptop computers, cellular phones, and PDAs. The communication device 340 originates the user commands 316 intended for the television receiver 320 by transmitting such commands 316 over the communication network 330 to the place-shifting device 310, which may then transform the commands 316 from a format compatible with the network 330 for use over the wireless connection 322. In one example, the communication network 330 may be a wide-area network (WAN), such as the Internet. In that case, the commands transmitted by the communication device 340 to the place-shifting device 310 may be formatted as digital data in one or more data packets conforming to the Transmission Control Protocol/Internet Protocol (TCP/IP), although other communication protocols may be employed to similar end in other embodiments. The place-shifting device 310 then converts that data into a form acceptable to the receiver 320 as the user commands 316. The commands 316 may direct the television receiver 320 to capture and transfer programming from one of the channels 311 to the place-shifting device 310, store the captured programming on the DVR 332, transfer programming currently residing on the DVR 332 to the place-shifting device 310, and other functions. Similarly, the selected television content 312 may be transferred or streamed over the communication network 330 by way of these same or related communication protocols.

In some embodiments, the content system 300 of FIG. 3 may include the EPG server 355, which is configured to store schedule information regarding the programs that are to be broadcast over the channels 311. This information may include the name or title of each program, the channel 311 over which each program is to be broadcast, and the time period during which the program is to be broadcast. Other information, such as viewer ratings, content ratings, brief descriptions of the content, and the like, may be included in the schedule information. In one implementation, the EPG server 355 may carry such information for programs for a predetermined period of time into the future, such as the next seven days. Additionally, the EPG server 355 may carry schedule information for programs that have already been broadcast within a predetermined period of time, such as the previous seven days. The EPG server 355 is also configured to provide this information to other devices, such as the communication node 350 of FIG. 3, via the communication network 330 upon request. More details concerning the use of the schedule information are provided below in conjunction with the operation of the communication node 350.

The television content system 300 may also include the VOCR server 360 mentioned above. The VOCR server 360 is configured to capture text from visual information of the received content 312. Such text may be gathered from, for example, an information "banner" provided by the television receiver 320, such as when a user changes the selected channel 311 for receiving a particular program. More specifically, the VOCR server 360 may employ optical character recognition software to extract the text from the information banner. The banner may provide several items of information, including a channel call-sign (such as "CNN" or "TBS"), a channel number, and a name or title of the program currently being broadcast. More details concerning the receipt of the banner and generation of the displayed text are provided below.

In other implementations, the functionality of the VOCR server 360 and the EPG server 355 may be incorporated into one or more of the other components of the television content system 300, such as the communication node 350, the communication device 340, and the place-shifting device 310. In yet other embodiments, video OCR functionality may not be provided if attribute data indicating the identity, as well as possible other attributes, of the received content 312 is available. For example, attribute information in the form of content metadata, or attribute data transmitted separate from the received content 312, may be available from the television receiver 320 or the place-shifting device 310.

The communication network 330 may incorporate any suitable networking technology, including, but not limited to, cable or digital subscriber line (DSL) gateways, wide-area mobile networks (such as GPRS, EDGE, 1X-RTT, 1x-EVDO, and FOMA 2.5G and 3G cellular networks), Wi-Fi and other public broadband access locations, WiMAX networks, local-area networks (LANs), and other connections to the Internet or other wide-area networks (WANs).

Figure 4:
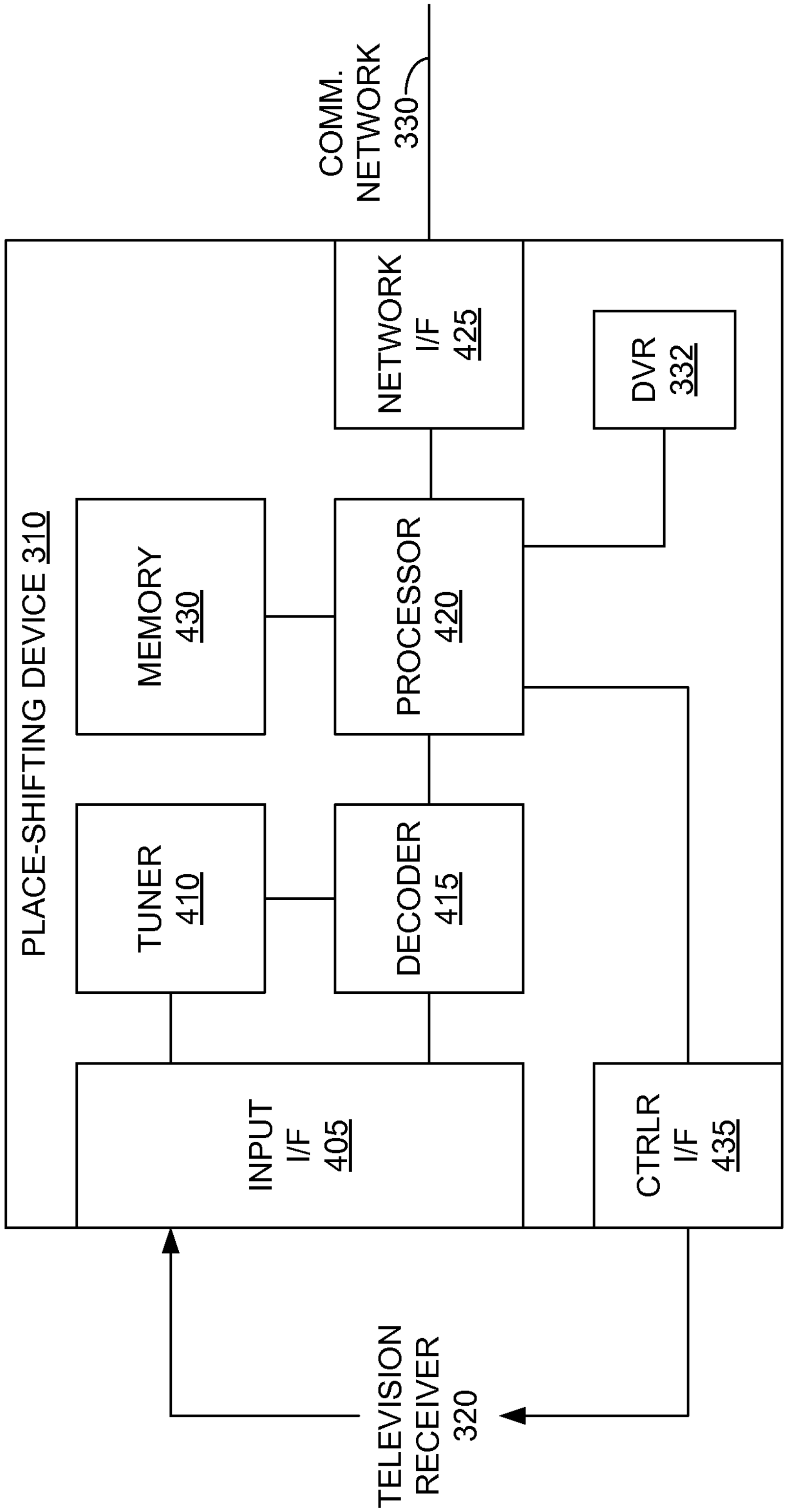
FIG. 4 is a block diagram of the place-shifting device of the television content system of FIG. 3 according to an embodiment of the invention.

FIG. 4 is a block diagram illustrating the place-shifting device 310 according to one embodiment. The space-shifting device 310 suitably includes an input interface 405, a tuner 410, a decoder 415, a memory 430, a processor 420, a controller interface 435, and a network interface 425.

Figure 5:
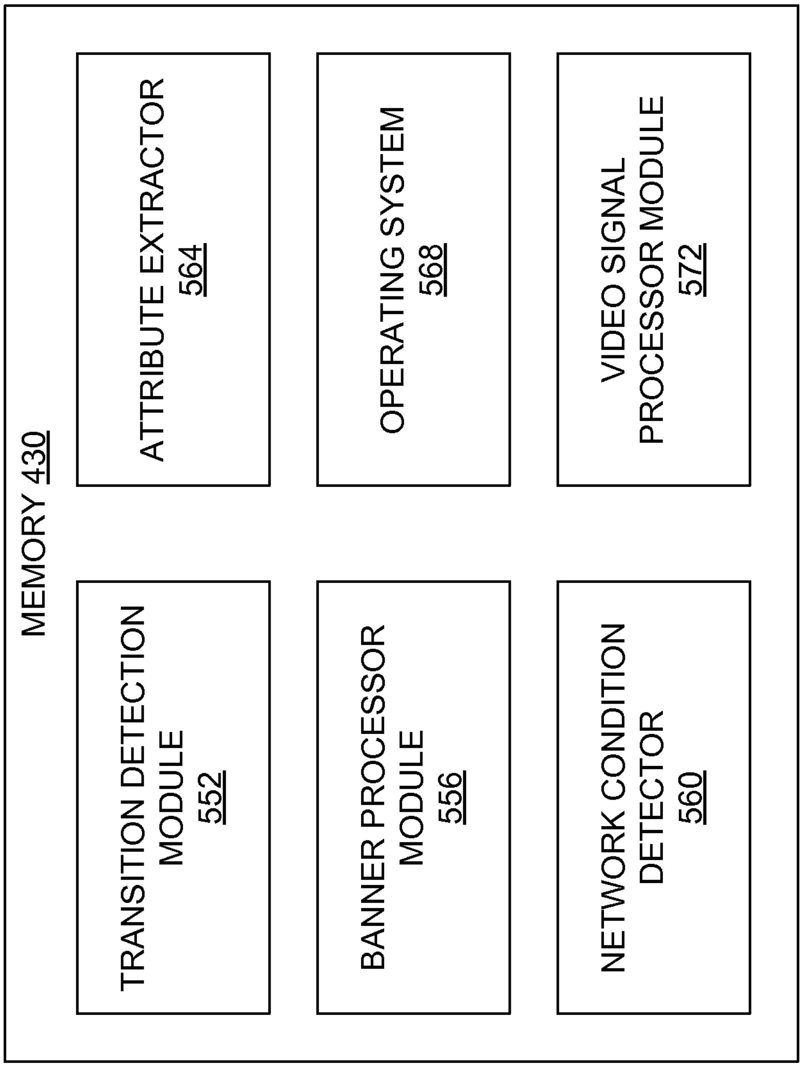
FIG. 5 is a block diagram illustrating software components of the place-shifting device of FIG. 4 according to an embodiment of the invention.

FIG. 5 is a block diagram illustrating exemplary software components of the place-shifting device 310 that may be stored in the memory 430, according to one embodiment. The software components of this embodiment can include, among other components, a transition detect module 552, a banner processor module 556, a network condition detector 560, an attribute extractor 564, an operating system 568, and a video signal processor module 572. These software components of the place-shifting device 310 may also be implemented as hardware or any combination of hardware and software. Also, two or more software components of the place-shifting device 310 may be combined into a single component.

The transition detect module 552 detects the transition in the media item received from the television receiver 320, as described below in detail with reference to FIG. 8. The media item received from the television receiver 320 may change for various reasons, such as switching of the channel or termination of scheduled broadcasting time. When the transition in the media item occurs, the attribute data of the media item may be stale and no longer be valid for the new media item. Therefore, updated attribute data of the new media item is generally obtained after the transition of the media item. The transition detect module 552 detects the transition of the media item in the A/V signal from the television receiver 320, and informs the banner processor module 556 and the attribute extractor 564 to obtain the updated attribute data of the new media item.

Figure 6:
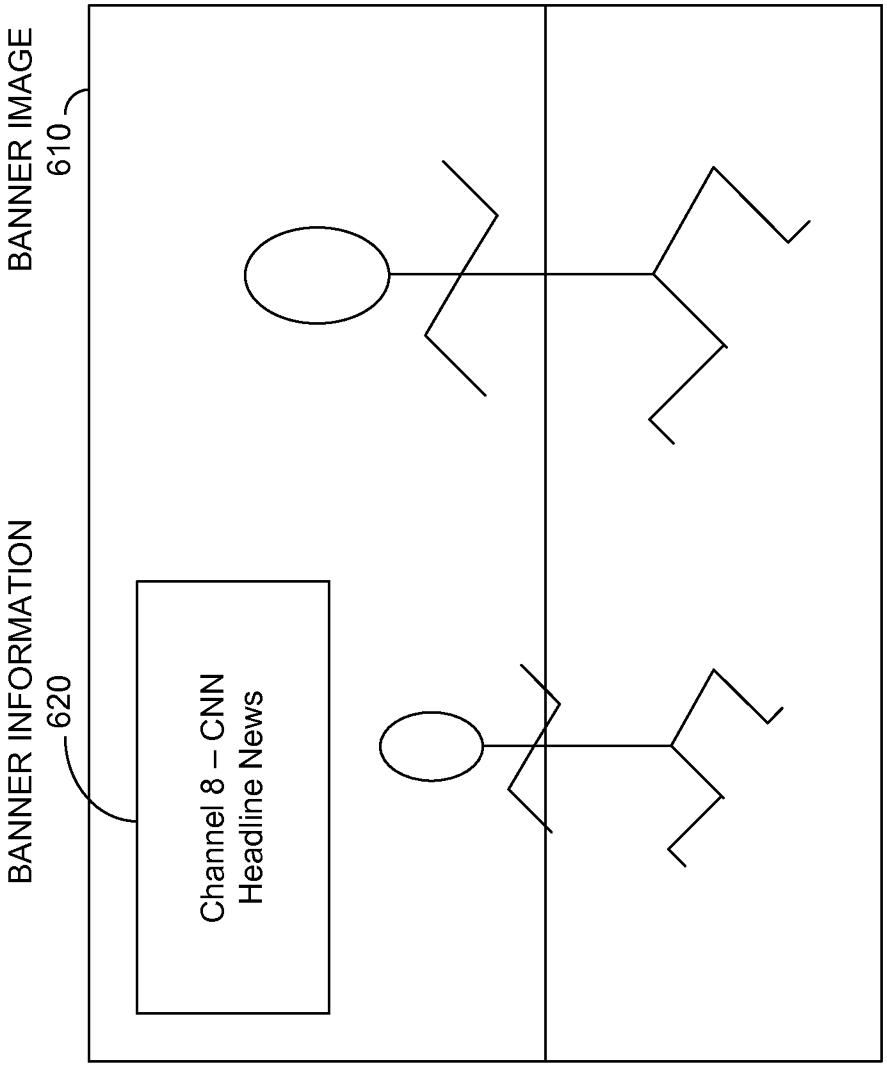
FIG. 6 is an example of a screen display depicting an information banner according to an embodiment of the invention.

In one embodiment, the banner processor module 556 is responsible for processing the portion of the image including the banner information ("banner image") for extracting the attribute data. The banner information is an on-screen display that may be embedded or otherwise presented by the television receiver 320 automatically upon certain events or in response to the user's inputs. Referring to FIG. 6, the banner information 620 of an image 610 includes information such as the channel name (e.g., "CNN") or channel number (e.g., 8). In some media sources, such as the television receiver 320 or set-top box, such banner information is generated when the user changes the current channel of the television receiver 320 or requests generation of a menu screen. More specifically, the user may change the channel of the television receiver 320 using a remote command from the communication device 340 transmitted over the network 330 to the place-shifting device 310. The place-shifting device 310 may relay the remote command to the television receiver 320 via the IR emitter or any other connection such as Ethernet, Universal Serial Bus (USB), or an RS-232 serial controller. In response, the television receiver 320 generates A/V signals that include the banner information 620.

The text can typically be extracted more accurately when the banner image is in higher resolution. Therefore, high-resolution banner images may be provided, when practical, for accurate extraction of the text data (and, hence, generation of accurate attribute data) from the banner image. Referring back to FIG. 5, in one embodiment, the banner processor module 556 tags a portion of the banner image 610 including the banner information 620. The tagged portion of the banner image 610 is then encoded at the video signal processor module 572 in higher quality of resolution compared to other portions of the image 610. In another embodiment, the banner processor module 556 does not interrupt or otherwise modify its normal video encoding and transmission operation of the media item, but instead makes a copy of a portion of the video data containing the banner information 620 prior to encoding of the video data, and then encodes the copy a second time in a high quality, as described below in detail with reference to FIG. 14.

In various embodiments, the banner image 610 may not be sent to the communication device 340 or to the VOCR server 360. Instead, the banner processor module 556 of the place-shifting device 310 processes the banner image 610 and extracts the attributes of the media item using optical character recognition technology. By processing the banner image 610 at the place-shifting device 310, the banner images 610 need not be transmitted to the VOCR server 360 or the communication device 340.

Extracting the attributes at the place-shifting device 310 is advantageous in some cases because transmission of the high-quality banner image 610 over the network 330 may no longer be needed, thereby reducing the network bandwidth used by the television content system 300. In other embodiments, however, the VOCR function may be performed at the communication device 340 or at a separate VOCR server 360, which may receive the banner from either the place-shifting device 310 or the communication device 340. Such embodiments are described more fully below.

In one embodiment, the banner processor module 556 learns the layout of the banner information 620 within the banner image 610. Before the layout of the banner is learned, all the text on the banner image 610 may be extracted and used for further processing at the outset. Over time, however, the banner processor module 556 may learn the layout of the banner, especially the location of the text of the key attributes. The banner processor module 556 may learn the layout of the banner information 620 based on consistent matching of the text in certain locations of the banner image and the attributes determined from other types of the attribute data. For example, the banner processor module 556 tracks the location of the banner information 620 that consistently matches the channel names in the EPG data, and then learns that the channel names are displayed at such location. Based on such learning, the banner processor module 556 selects a portion of the image that is predicted as including the banner information 620. Only the predicted portion of the image may then be subject to further processing at the banner processor module 556 or sent to the communication device 340 to extract the attribute data, thereby conserving processing resources. In this way, the attribute data can be extracted efficiently and accurately without a priori knowledge about the location of the banner information 620 within the banner image 610.

In one or more embodiments, the communication device 340 forces the television receiver 320 to generate the banner image 610 via the place-shifting device 310. Alternately or additionally, the place-shifting device 310 may automatically generate the banner image 610 without additional instruction from the communication device 340 in certain circumstances (e.g., near the top or bottom of the hour, or at other times when programming changes are expected). In either case, the banner image 610 may be forced when the transition to a new media item is suspected. If the television receiver 320 does not automatically provide banner information after the suspected event or if the place-shifting device 310 cannot reliably capture a banner image 610 following the transition of the media item, a command 316 may be sent from the communication device 340 to the television receiver 320 via the place-shifting device 310 forcing the television receiver 320 to generate the banner image 610. For example, an 'info command' may be sent from the place-shifting device 310 to the television receiver 320 via the IR emitter to force the banner image 610. In one embodiment, the banner processing module 556 also performs preprocessing of the image for more accurate recognition of the text by the communication device 340 or the VOCR server 360.

In one or more embodiments where the banner image 610 is transmitted to the communication device 340 or the VOCR server 360 to extract the attribute data, the network condition detector 560 operates in conjunction with the network interface 425 to determine the condition and bandwidth of the communication network 330. If the condition and bandwidth of the network 330 allow simultaneous transfer of the datastream of the selected media content 312 from the television receiver 320 (as converted by the video signal processing module 572) and the banner image data, the media item datastream and the banner image data are sent over the network 330 in the same channel. In contrast, if the condition and bandwidth of the network 330 does not allow simultaneous transfer of the media item datastream and the banner image data over the network 330, the media item data is given priority over the banner image data. That is, the banner image data is sent over the network 330 in a separate channel using the bandwidth of the network 330 available after transmitting the media item data.

The attribute extractor 564 suitably extracts the attribute data from the A/V signals received from the television receiver 320. The attribute data refers to data that can be used to identify the identity or any other attributes of the media content or item 312. In one embodiment, the attribute extractor 564 extracts electronic program guide (EPG) data, closed caption data, and XDS (extended Data Services) data from the A/V signals from the television receiver 320. The attribute data extracted by the attribute extractor 564 is sent to the communication device 340 over the network 330 to determine the attributes of the received media content 312.

The operating system 568 manages resources of the place-shifting device 310. The operating system 568 provides a platform on which other software components of the place-shifting device 310 may operate.

The video signal processor module 572 converts the A/V signals received from the television receiver 320 into a datastream suitable for transmission over the network 330. The conversion includes scaling of the images, encoding of the video sequence, and compressing of the video sequence.

Figure 7:
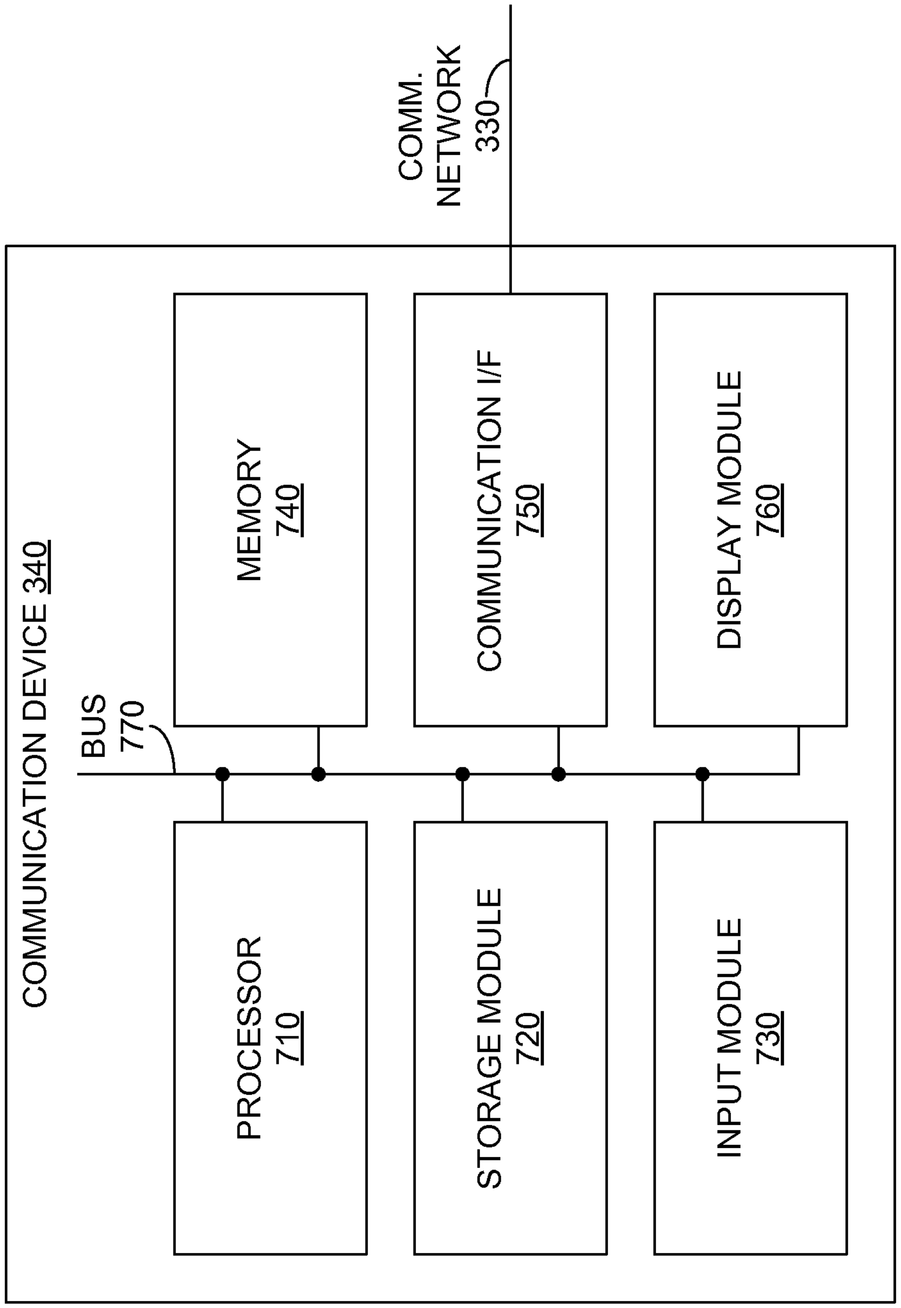
FIG. 7 is a block diagram of the communication device of FIG. 3 according to an embodiment of the invention.

FIG. 7 is a block diagram of an exemplary communication device 340 according to one embodiment. The communication device 340 includes, among other components, a processor 710, a memory 740, a storage module 720, a communication interface 750, an input module 730, and a display module 760. Not all components of the communication device 340 are shown in FIG. 7, and certain components not necessary for illustration are omitted herein. Each of the components of the communication device 340 may be communicatively coupled though a bus 770.

The processor 710 may be any processing unit, such as a microprocessor or digital signal processor (DSP) capable of executing instructions to perform the functions described hereinafter. The memory 740 is digital memory such as a static or dynamic random access memory (RAM). The storage module 720 is nonvolatile storage media, such as, for example, a flash memory or a hard disk drive (e.g., magnetic hard drive). The storage module 720 typically stores software components, as described below with reference to FIG. 8, to be executed by the processor 710. The input module 730 can be a keyboard, a touch-sensitive screen, or any other type of input device, and the display module 760 can be a flat panel display such as liquid crystal display (LCD) device or any other type of display device.

The communication interface 750 may include one or more wired or wireless communication interfaces used to communicate with the place-shifting device 310 or the communication node 350 over the network 330. For example, the communication interface 750 may include an Ethernet (e.g., 10Base-T interface and/or a Wi-Fi interface (e.g., IEEE 802.11b/g)) for communication via the Internet.

Figure 8:
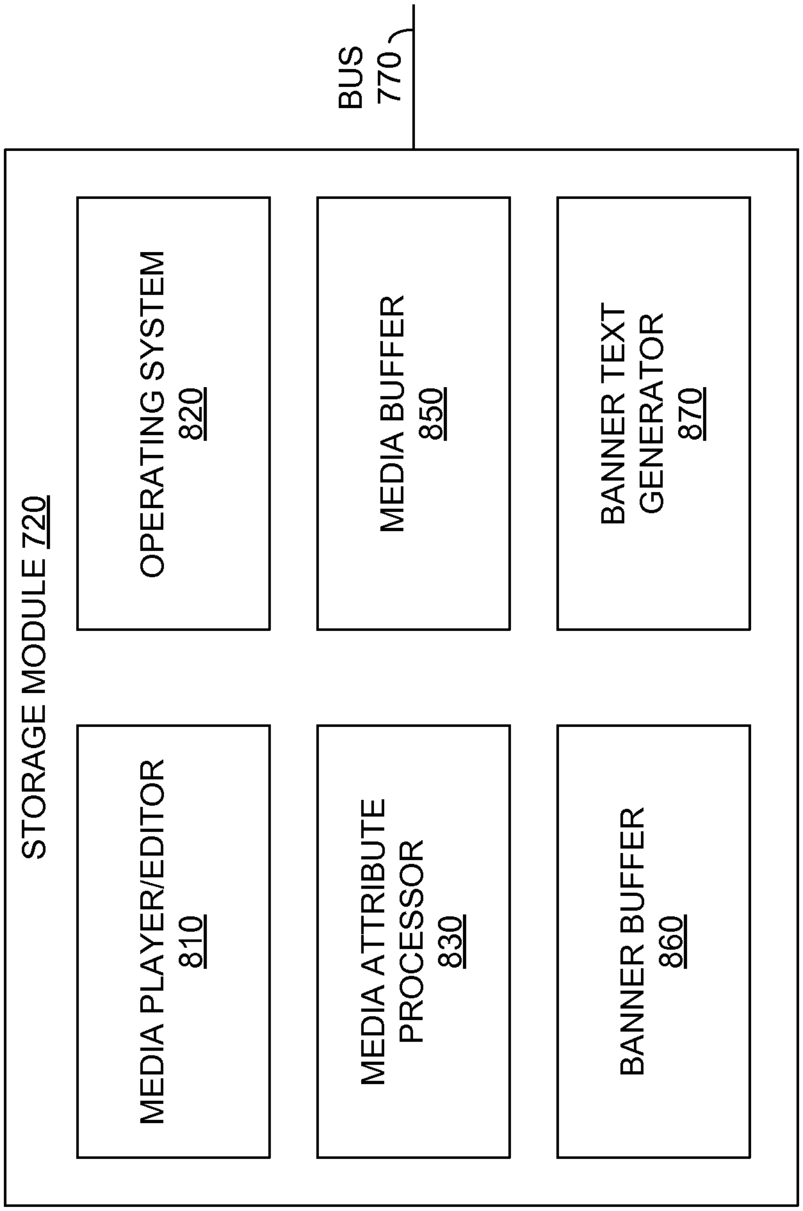
FIG. 8 is a block diagram of a storage module of the communication device of FIG. 7 according to an embodiment of the invention.

FIG. 8 illustrates the software components of the communication device 340 according to one embodiment. The storage module 720 in the communication device 340 includes, among other components, a media player/editor 810, an operating system 820, a media attribute processor 830, a media buffer 850, and a banner buffer 860. In one embodiment, the storage module 820 further includes a banner text generator 870. The media player/editor 810 allows the users to play, clip, or edit the media item received from the place-shifting device 310 over the network 330. The media player/editor 810 operates in conjunction with the media buffer 850 so that the user may play, clip, or edit the portion of the received media content 312 that is buffered in the media buffer 850. After selecting, clipping, or editing the received content 312, the media player/editor 810 stores the content item 312 in the communication device 340 or uploads the media item 312 to another device for storing and sharing. The media item 312 may be further processed (e.g., transcoded or edited) before uploading.

In one embodiment, the media player/editor 810 receives user inputs for invoking operations at the television receiver 320. For example, when the user wants to change the channel 311 of the television receiver 320, the user may change the channel 311 of the receiver 320 currently being viewed using the user interface of the media player/editor 810 to send user commands 316 to the place-shifting device 310. The place-shifting device 310 relays the commands 316 to the television receiver 320 via the IR emitter or other controllers, as described above with reference to FIG. 3.

The operating system 820 manages resources of the communication device 340. Further, the operating system 820 provides a platform on which other software components of the communication device 340 may operate.

In one embodiment, the media attribute processor 830 functions to determine the identity or attributes of the media item based on the attribute data from one or more sources. The attribute data may include, among other data, EPG data, closed caption data, XDS (eXtended Data Services) data, and data filtered and extracted from the banner image 610 using the banner text generator 870, VOCR server 360 and/or any other source as appropriate. As described below in detail, the banner text generator 870 or the VOCR server 360 recognizes the text included in the banner image 610 using, for example, optical character recognition technology or the like. Any of the various techniques described above with respect to banner processor module 556 could be equivalently deployed in banner text generator 870 in any number of alternate embodiments. The media attribute processor 830 uses one or more types of the attribute data to determine the identity or attributes of the media item.

In one embodiment, the media attribute processor 830 determines first candidate attributes based on first attribute data (e.g., EPG data, closed caption data, or XDS data). Subsequently, the media attribute processor 830 determines second candidate attributes based on second attribute data (e.g., text extracted from the banner information 620). The media attribute processor 830 considers the first and second candidate attributes to produce final identity or attributes of the media item.

In one embodiment, the media attribute processor 830 generates a confidence score based on the matching of the first and second candidate attributes. The confidence score indicates likelihood that the final identity or attributes of the media item determined by the media attribute processor 830 are accurate. If the first and second candidate attributes do not match, a low confidence score may be assigned to the final attributes to indicate that the final attributes may be incorrect. In contrast, if the first and second candidate attributes match, a high confidence score may be assigned to the final identity or attributes to indicate that the final attributes are probably correct. The confidence score may then be stored on the communication node 350 or the communication device 340 together with the identity or final attributes of the media item.

In one embodiment, the media attribute processor 830 includes filters to obtain information relevant to determining the attributes of the received media content item 312, as described below in greater detail. The media attribute processor 830 may learn the structure of the banner information 620 to obtain text data from only certain parts of the banner image 610. The filtering functionality may also be implemented in the VOCR server 360 or the banner text generator 870 instead of the media attribute processor 830.

In one embodiment, the media attribute processor 830 determines the attributes of the media item 312 only after the user selects, clips, or edits the media item 312. The attribute data is stored in the media buffer 850 and the banner buffer 860, and the attribute data is processed after the user selects, clips, or edits the media item. By deferring the processing of the attribute data until the media item 312 is selected, clipped, or edited by the user, processing resources of the communication device 340 or the VOCR system 360 need not be consumed on processing the attribute data for the media item 312 that the user does not want stored on the communication device 340.

In one embodiment, the media attribute processor 830 may operate in conjunction with a communication node 350 or another device (not shown) via the network 330 to determine the attributes of the media item 312. For example, the media attribute processor 830 obtains certain attributes (e.g., the channel number, name of the broadcaster, and time of the broadcast) of the media item 312 using one or more sources of the attribute data, and then accesses a database for storing broadcasted media items (such as Tribune or other program database) to determine additional attributes of the media item 312 (e.g., the name or episode of the program) or determine the identity of the media item 312. The program database, such as the EPG database 355 of FIG. 3, may be, for example, a database managed by Tribune Media Services of Chicago, Ill., or any other party that contains information of channel line-ups for various satellite, broadcast and/or cable service providers. The media attribute processor 830 generates multiple candidate attributes of the media item 312, and matches the candidate attributes with data stored on the Tribune database to determine the most likely identity and attributes of the media item.

The media buffer 850 temporarily stores a predetermined amount of the media item 312 received from the place-shifting device 310 so that the media item 312 may be accessed or edited in a time-shifted manner. In one embodiment, the media buffer 850 is a ring buffer that deletes older media items and updates it with newly-received media items.

The media buffer 850 allows the user to retrieve previously received portions of the media item 312 for playing, clipping, or editing of the media item 312 using, for example, the media player/editor 810. In one embodiment, the media buffer 650 stores the attribute data received from sources other than the banner image 610.

The banner buffer 860 stores the banner image 610 selected from a video sequence of the media item 312. The banner buffer 860 may store a full screen image of the banner image 610 or a portion of the banner image 610 including the banner information 620. As described above with reference to FIG. 5, the banner processor module 556 of the place-shifting device 310 may determine the portion of the banner image 610 including the banner information 620 and send only this portion of the banner image 610 in high resolution to the communication device 340. The banner buffer 860 stores the banner image 610 for retrieval by the banner text generator 870 or the media attribute processor 830. The media attribute processor 830 may retrieve and send the banner image 610 to the VOCR server 360 for extraction of the text data. In one embodiment, the banner buffer 860 is combined with the media buffer 850.

In one embodiment, the communication device 340 includes a banner text generator 870. The banner text generator 870 includes an optical character recognition engine that processes the banner image 610 stored in the banner buffer 860. Specifically, the banner text generator 870 extracts text data included in the banner image 610. The extracted text data is processed by the media attribute processor 830 to determine the attributes of the media item.

Alternatively, the communication device 340 does not include the banner text generator 870. Instead, the text data is extracted using the VOCR server 360 located remotely from the communication device 340 and communicating with the communication device 340 over the network 330. In this embodiment, the media attribute processor 830 sends the banner images 610 to the video optical recognition server 360 via the network 330 for processing. The VOCR server 360 extracts the text data from the banner information 620 and returns the extracted text data to the communication device 340.

The processing of the banner image 610 to extract text data is generally considered to be relatively computation intensive; thus, the communication device 340 may not necessarily have sufficient capacity or capability to extract the text data using the optical character recognition algorithm. By delegating the text data extraction to the VOCR server 360, the communication device 340 may perform other operations (e.g., receiving and decoding of the datastream from the place-shifting device 310) without experiencing interruptions due to processes associated with extraction of the text data from the banner image 610.

In one embodiment, the process of extracting the text data may be distributed between the communication device 340 and the VOCR server 360. For example, the communication device 340 may "pre-process" portions of the banner image 610 by sending only relevant portions of the banner image 610 to the VOCR server 360 for text recognition. The recognized text may be sent from the VOCR server 360 to the communication device 340 for performing "post-processing" on the recognized text such as applying rules or syntax to extract certain attributes (e.g., date or time).

In one embodiment, the banner text generator 870 or the VOCR server 360 outputs the text data including characters recognized from the banner image 610. The text data without further processing may be merely a string of characters that does not by itself indicate the identity or attributes of the media item. Referring to FIG. 6, for example, the text data may read "Channel 8—CNN."

Unless the characters in such text are separated and filtered in a meaningful way (e.g., channel number on this set-top box is "8", and the name of the broadcaster is "CNN"), the communication device 340 cannot typically determine the identity or attributes of the media item. Accordingly, filtering or post-processing of the text data can be applied to determine the identity or attributes of the media item from the text data. Further, the information extracted from the banner/VOCR process may be verified against program data obtained from any other available source (e.g, the program database) to further improve the reliability of such data.

In one embodiment, hardware or software components for filtering or post-processing the extracted text data from the banner image 610 may be implemented in the banner text generator 870, the VOCR server 360, or other components of the television content system 300.

The attributes of the media item 312 that can be extracted from the text data may include, among other information, dates/times, the name of the channel broadcasting the media item, the channel number, and the title of the media item. In one embodiment, the banner text generator 870 or the VOCR server 360 outputs the locations of the characters within the image along with the extracted text data.

The locations of the characters may be used to take into account spatial correlations between the characters in determining the identity or attributes of the media item. For example, if two numbers appearing in the image (e.g., "1" and "5") are adjacent to each other, the two numbers may be merged into a single number (e.g., "15"). By merging or grouping certain characters using spatial correlations between the characters, meaningful attribute data can be generated from the raw text data.

In one embodiment, to obtain dates and/or times in the banner information, the text data can be scanned for strings of characters and numbers matching predefined date-time formats. Examples of the predefined date formats include, without limitation, the following: m/d/yyyy, m/dd/yyyy, mm/d/yyyy, mm/dd/yyyy, m-d-yyyy, m-dd-yyyy, mm-dd-yyyy, mm-dd-yyyy, m/d/yy, m/dd/yy, mm/d/yy, mm/dd/yy, m-d-yy, m-dd-yy, mm-dd-yy, m/dd, mm/dd, m/d, mm/d, m-dd, mm-dd, m-d, mm-d and/or the like (where 'm' refers to a single digit number indicating month, 'd' refers to a single digit number indicating date, and 'y' refers to a single digit number indicating year). Likewise, examples of the predefined time formats could include, without limitation: h, h/nn, h, h/nn/(a or p), h/nn-h/lnn, hh/nn, and h/nn/(am or pm) (where 'h' refers to a single digit number indicating hour, 'n' refers to a single digit number indicating minute, 'a' refers to ante meridiem, 'p' refers to post meridiem). A string of alphanumeric characters matching such formats are classified as candidates for characters indicating dates or times.

To obtain channel names, the following exemplary rules may be used: (1) the length of the channel name is restricted (e.g., not less than two characters and not more than eight characters), (2) the first and last character are alphanumeric characters, (3) the channel name should not coincide with date-time format (as described above in detail), and (4) the channel should not include certain characters or certain strings of characters.

To obtain channel numbers, the numbers not matching the date-time formats are selected as candidates for channel numbers. Further, numbers closely located to the channel names are considered likely candidates for the channel numbers.

To obtain the candidate text for the title of the media item, the spatial correlation between candidate characters for the title of the media item and candidate characters for the channel name and/or the channel number may be considered. In one embodiment, the area of the image (e.g., text box) including the channel name or the channel number becomes a reference area for searching the title of the media item. Predefined areas in proximity to the reference area are searched for the title of the media item. The predefined area is, for example, an area above or below the area for the channel name or number having double the height of the text box for the channel name or number. If no candidate for the title of the media item is found within the predefined area, then the search can be expanded to other areas of the image for any alphanumeric characters that are likely to be the title of the media item. A filter may also be used to exclude alphanumeric characters that are unlikely to be the title of the media item.

In one embodiment, the algorithms and filters may be updated after deployment of the component including hardware or software components for filtering and post-processing of the text data. For example, the filters for excluding certain strings of characters from being classified as the title of the media item may be revised and updated dynamically to more accurately determine the attributes of the media item.

In one embodiment, the accuracy of extracted attributes may be improved gradually over time using a learning algorithm to learn the structure of banner information. Specifically, learning algorithm accumulates information on which area of the image generally includes information for certain attributes. During the learning process, the attribute data from other sources (e.g., XDS data) can be used to learn and confirm which areas of the image include which information. The banner processor module 556 suitably learns the layout of the banner information 620 based on consistent matching of the text in certain locations of the banner image 610 and the attributes determined from other types of the attribute data. For example, the banner processor module 556 may track the location of the banner information 620 that consistently matches the channel names in the EPG data, and then learn that the channel names are displayed at such location. In one embodiment, the confidence score may be considered in determining whether the channel names match with the text extracted from certain locations of the banner image. By automatically learning the structure of the banner information 620, the attributes can be extracted accurately and efficiently without a priori knowledge of the banner information structure.

In one embodiment, the information of the learned layout of the banner information 620 is stored in a learning table where each entry within the table contains location information (e.g., x-coordinate, y-coordinate, width and height), success rate, and entry last updated time (ELUT).

In such embodiments, the text extracted from the banner information 620 can be first searched for results matching the attributes of the media item 312. The text is determined as coinciding with certain attributes of the media item 312 when the confidence score for the attribute exceeds a certain threshold. In each learning cycle, the text from some or all of the regions of the banner image 610 can be processed. For each discrete region of the banner image 610 including the text, an entry is created in the learning table to keep track of the success count for matching of the text with attributes of the media item 312.

Specifically, if the text from one region of the banner image 610 matches a certain attribute (as determined from the confidence score derived from matching with attributes from other sources), the success count can be incremented by one (or any other appropriate value). As described above, the text from the banner information 620 can be determined as matching the attribute when the confidence score for that attribute exceeds a threshold.

After the region provides a successful count for over a predetermined number (e.g., three (3)) of banner images 610, the entry in the table is considered and flagged as having been learned successfully. Alternatively, if a different region in the next banner image 610 matches the attributes, the different region is newly added to the entry (if not previously added), and the success count for the attribute is increased (e.g., by one or another suitable value) for the newly added entry. For each banner image, the matching regions are identified, and the success count for each region is increased for matching attributes. By repeating the process over a number of banner images 610, the learning table accumulates information on which regions of the banner image 610 includes the text on which attributes of the media item 312.

Further, in various embodiments, aging may be introduced in the learning mechanism to update or relearn the banner information structure when the learning becomes outdated or invalid. For example, if a confidence score associated with the attributes determined from the banner information 620 drops and persists for a certain amount of time, previous learning can be discarded and a new learning process started. Specifically, the entries in the learning table may be monitored to track for increase in the success count. If the success count for an entry is not increased for a certain amount of time (e.g., seven (7) days or so) or for a certain number of banner images 610, the entry may have been incorrectly learned or the entry may be outdated. After the success count for the entry is not increased for a certain amount of time or for a certain number of banner images 610, the entry may be removed from the learning table or the success count for that entry may be decreased for each upcoming banner image 610. After the success count reaches zero or another predetermined value, the entry can be removed from the learning table.

In one embodiment, vertically (or otherwise) shifted locations of the region as indicated by the entry are searched before removing the entry from the learning table. Some service providers shift the regions for displaying certain attributes of the media item vertically up or down in each banner image 610. Therefore, to avoid removing entries for such cases, the attributes can be searched in the vertically shifted regions before removing the entry from the learning table. The entries may also be flagged to indicate that coinciding text is found at vertically shifted locations so that vertically shifted locations are searched in the subsequent banner images 610.

Figure 9:
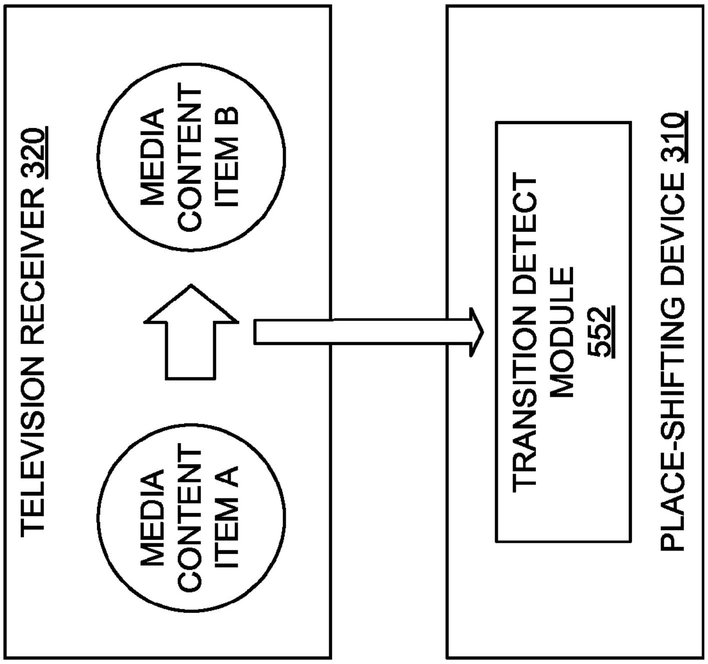
FIG. 9 is a block diagram illustrating transitions between media content items according to an embodiment of the invention.

FIG. 9 is a diagram illustrating an exemplary transition of the media items provided by the television receiver 320 to the place-shifting device 310. The A/V signals provided by the television receiver 320 may include data for media item A at a certain time. At a subsequent time, the A/V signals sent by the television receiver 320 may include data for media item B. Detecting the transition of the media item from the television receiver 320 can be important because the identity or attributes are typically updated as the A/V signals include a new media item.

The transition of the media item can occur for various reasons including, among other reasons, scheduled termination of a media item followed by another media item, user inputs (via either the communication device 340 or the television receiver 320) commanding the television receiver 320 to change channels 311 or sources of input, and commands from a service provider prompting changes in the media item.

Figure 10:
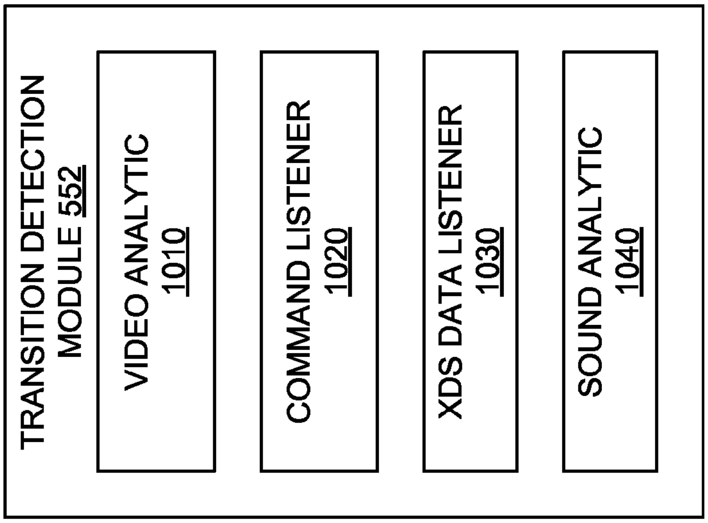
FIG. 10 is a block diagram of a transition detection module of the place-shifting device of FIG. 4 according to an embodiment of the invention.

The transition detect module 552 of the place-shifting device 310 may therefore use one or more methods to detect the transition of the media item. As shown in FIG. 10, an exemplary transition detect module 552 may include, for example, a video analytic module 1010, a command listener module 1020, an XDS data listener module 1030, and a sound analytic module 1040. After detecting the transition of the media item using any of these modules, the transition detect module 552 may request the television receiver 320 to provide updated attribute data.

The video analytic module 1010 detects changes in the images received from the television receiver 320 indicative of the transition in the media item. In one embodiment, the video analytic module 1010 detects black screens, frozen screens, and transition from a menu screen (e.g., an electronic program guide (EPG) screen) to a non-menu screen and/or the like. In many media sources, such as the television receiver 320, the black screens or the frozen screens can appear before transitioning to a different channel 311. Also, the menu screens are often used by the user to find and switch to a channel 311 that the user wants to view. Therefore, the black screens, the frozen screens, and transition to or from the menu screen serves as cues for the transition in the media item 312.

In one embodiment, the black screens can be detected by calculating the average luminance value of all the macroblocks in an image. For example, the image can be determined as a black screen if a certain number of macroblocks within the image are predominantly filled with black (or dark) pixels. In one embodiment, one macroblock may be a 16×16 or 8×8 or any such array of pixels in the image.

In one embodiment, frozen screens can be detected by calculating the absolute sum of motion vectors in the macroblocks in consecutive images of a video sequence. If the absolute sum of the motion vectors in the consecutive images is below a threshold value, the screen may be appropriately determined to be a frozen screen.

Figures 11A, 11B, 11C:
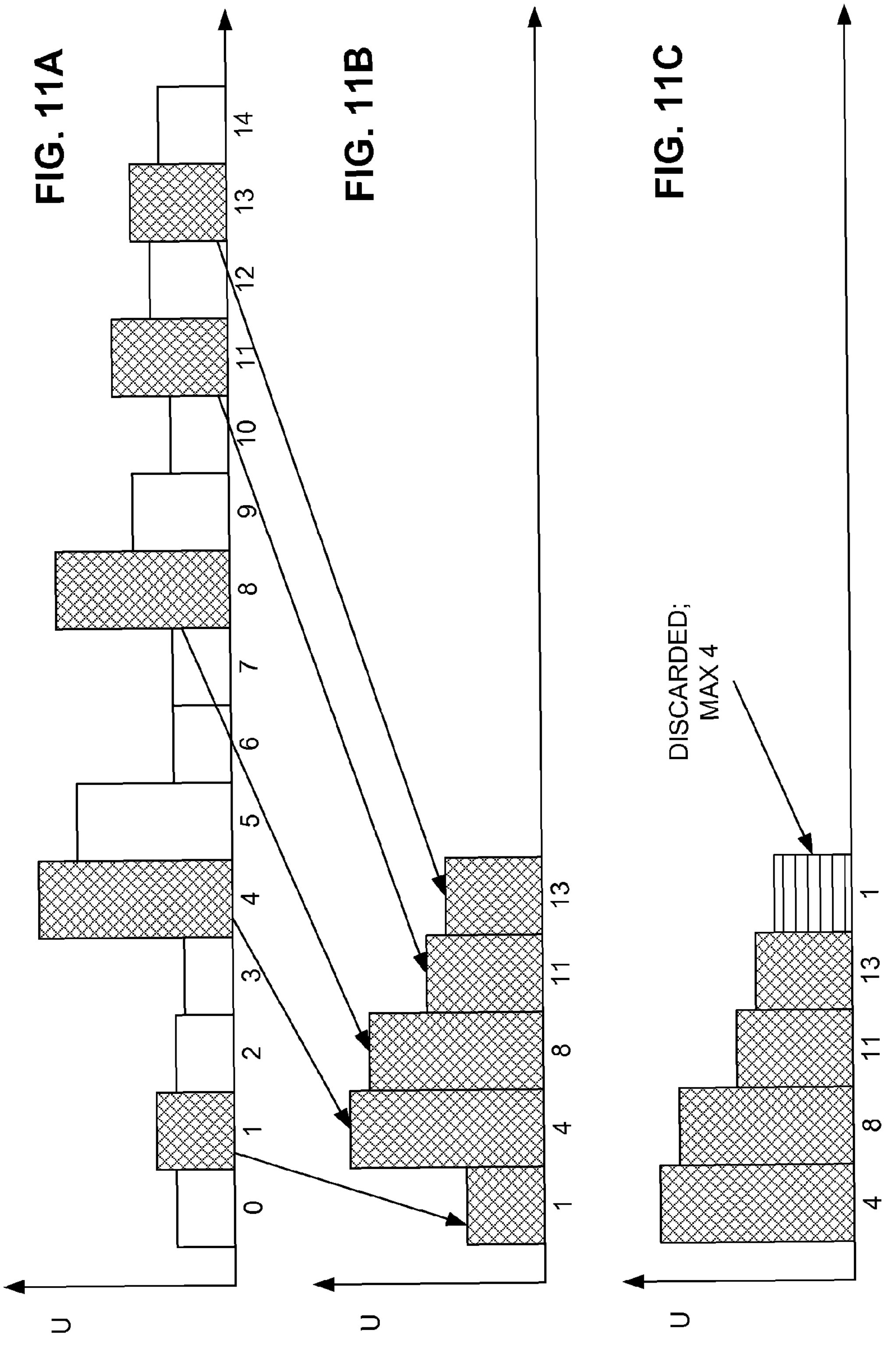
FIGS. 11A-11C are diagrams illustrating a technique for detecting changes in color components of images according to an embodiment of the invention.

In one embodiment, the transition to or from a menu screen is detected using changes in the color components in the images. One method of detecting the transition is to use the U and V components of the YUV color data of pixels in the images. First, U values for some or all of the pixels may be obtained to generate a normalized histogram as illustrated in FIG. 11A. Then local maximum U values across a certain number of pixels (e.g., four pixels) can be obtained as illustrated in FIG. 11B.

From the local maximum U values, a predetermined number (e.g., four in the example of FIG. 11C) of highest U values are selected as illustrated in FIG. 11C. The rest of the local maximum U values can be discarded from further analysis, as appropriate. The selected local maximum U values are then considered to be signature U values for that image. Signature V values are obtained in the same manner as the signature U values except that V values of the pixels are used instead of the U values. After obtaining the signature U and V values, these signature values from a previous (or next) image are compared with a current image. If the differences in the signature U and V values between the current and the previous (or next) image exceed a threshold, it may be determined that the transition to or from a menu screen has occurred.

In one embodiment, the transition to or from a menu screen is detected using the presence or the amount of text present in the images. If the number of characters appearing in the image is below a threshold or if the image does not have any characters, the image can be determined to be a non-menu screen. In contrast, if the number of characters in the image is above the threshold, the screen can be determined as a menu screen. In order to reduce the computation required to detect the menu screen using the number of characters, a coarse determination of text lines may be used instead of extracting the text data using the computation-intensive optical character recognition algorithm. One example of coarsely determining the text lines is to determine areas occupied by text lines characterized by portions of image having high contrast horizontal edges.

In one embodiment, the transition to or from a menu screen is detected using motion vectors in the images. If the motions in the consecutive images are low, then the image is determined as a candidate for a menu screen. The frozen images also generally have low motions, and thus, the transition detect module 552 may include codes and algorithm to distinguish the frozen images and the menu screen.

With reference again to FIG. 10, the command listener 1020 suitably detects commands 316 from the communication device 340 for operating the television receiver 320 via the place-shifting device 310. The television receiver 320 may be controlled remotely by the communication device 340 via the controller interface 435 of the place-shifting device 310. The command listener 1020 detects commands from the communication device 340. The commands 316 from the communication device 340 may include, among others, a channel change command, a volume change command, a device configuration command, and/or the like. Some commands may be context-sensitive and cause transition of the media item 312 under some circumstances but not in others. It may therefore be difficult to distinguish between commands 316 that cause transition in the media item 312 and commands that do not cause transition in the media item 312. Accordingly, in some embodiments, some or all of the commands 316 received from the communication device 340 to operate the television receiver 320 can be treated as cues for changing the media item 312 at the television receiver 320. After the commands 316 are detected at the command listener 1020, the video analytic module 1010 can be activated to detect the transition between the media item A and the media item B of FIG. 9. Following the activation of the video analytic module 1010, the banner processor module 556 and the attribute extractor 564 are notified of the suspected transition so that these modules may extract the new attribute data associated with the new media item.

The XDS data listener 1030 suitably detects changes in the XDS data received from the television receiver 320. The XDS data includes, among other data, the title of the media item 312, the name of the broadcaster, the category of the media item 312, the episode number of the series, the rating of the media item 312, and the program synopsis. The changes in the XDS data are often caused by changes in the media item 312. Therefore, the changes in the XDS data may be monitored to detect the transition of the media item 312.

The sound analytic module 1040 suitably detects whether the audio from the television receiver 320 is silent. In some media sources, such as the television receiver 320, changes in the channel 311 are accompanied by silence in the audio. In one embodiment, the sound analytic module 1040 is used in conjunction with the video analytic module 1010 to determine the transition in the media item 312.

The above modules of the transition detect module 552 are merely illustrative. Other methods and cues may also be used by the transition detect module 552 to determine the transition of the media item 312 received from the television receiver 320. In one embodiment, more than one of the modules in the transition detect module 552 are cooperatively employed to improve the accuracy of the media item transition detection.

Figure 12:
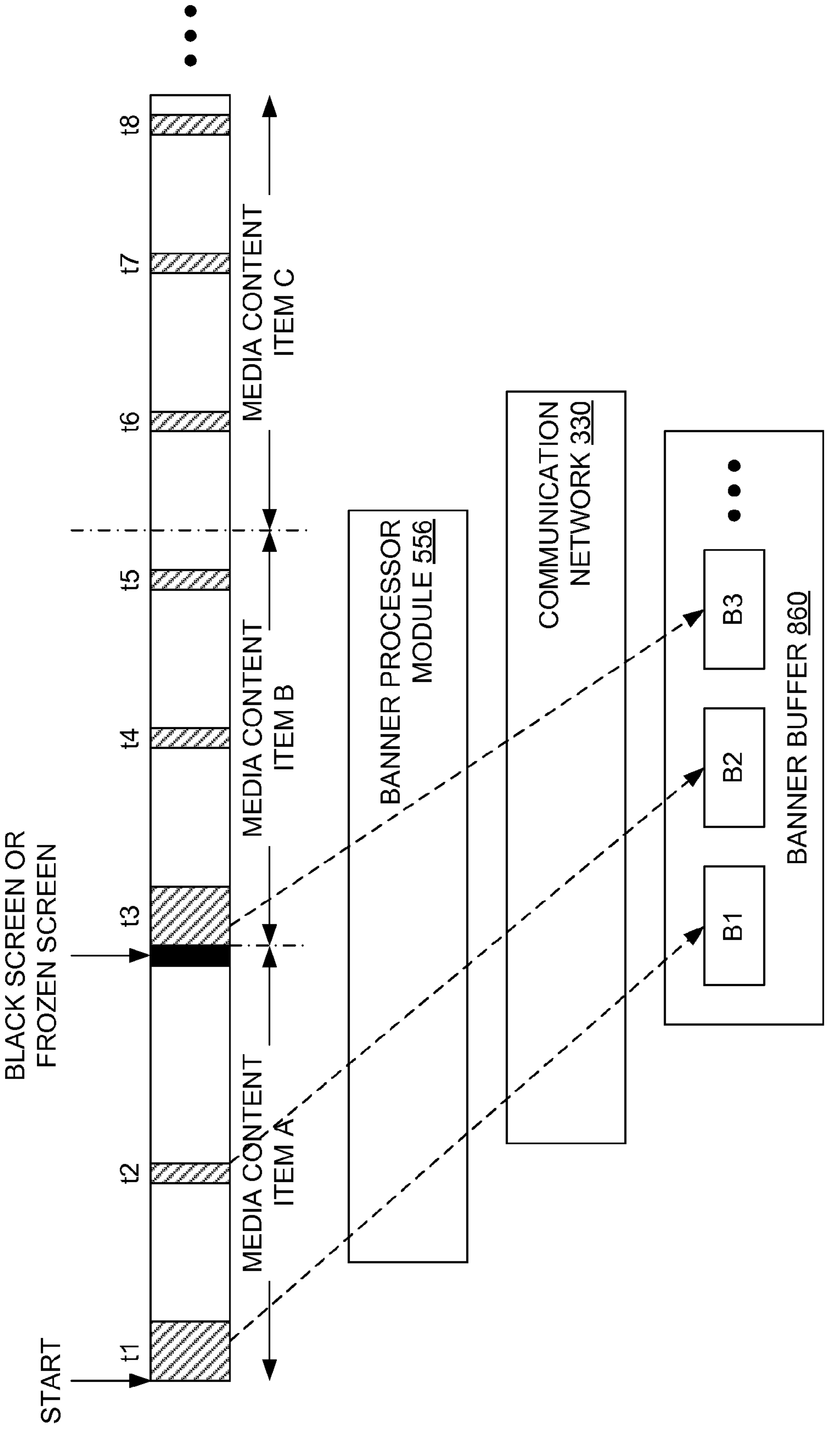
FIG. 12 is a diagram illustrating a process for capturing and buffering banner images according to an embodiment of the invention.

FIG. 12 is a diagram illustrating an exemplary scheme for capturing and buffering of the banner image 610 in the place-shifting device 310, according to various embodiments. After detecting transition of the media item 312 at the transition detect module 552, the banner processor module 556 of the place-shifting device 310 suitably captures the banner image 610 from the television receiver 320. In one embodiment, the banner image 610 is captured after a certain amount of time elapses from the time the transition is detected. This is because in some media sources, the banner information 620 is automatically displayed shortly after the channel 311 changes. Therefore, the banner image 610 can be captured shortly after an event indicative of the transition is detected. The amount of elapsed time for capturing the banner image 610 may be set differently depending on the type of the television receiver 320.

In other media sources, the banner information 620 is not automatically displayed on the screen after the channel 311 changes. For such media sources, the place-shifting device 310 may force the television receiver 320 to display the banner information 620 by transmitting a command 316 requesting the banner image 610 to the television receiver 320 via the controller interface 435.

The transition detect module 552, however, may not detect all of the transitions in the media items. For example, the transition detect module 552 may not detect the transition of the media item 312 when a media item terminates after the scheduled time and no XDS data is available from the channel 311 broadcasting the media item 312. Therefore, the place-shifting device 310 can periodically send commands 316 to the television receiver 320 to have the television receiver 320 provide the banner image 610, and can also capture other attribute data (e.g., XDS data) included in the A/V signal from the television receiver 320. The place-shifting device 310 then captures the banner image 610 as appropriate. In one embodiment, the place-shifting device 310 sends another command 316 removing the banner information 620 from the screen after capturing the image 610 to reduce the time during which the banner information 620 appears on the screen. By reducing the time during which the banner information 620 is displayed, the user may experience less inconvenience associated with banner information 620 appearing on the screen.

In one embodiment, the communication device 340 sends the commands 316 to force the banner image 610 consistent with the broadcasting schedule of the media items. For example, it is common for media items to start and end at regular time intervals, such as every thirty minutes or every hour. The communication device 340 may therefore keep track of the local time at the location where the place-shifting device 310 is located, and may send out the commands 316 to the television receiver 320 to force the banners 610 at or around the half-hour or one-hour boundaries. By capturing the banner images 610 in accordance with the broadcasting schedule, the likelihood of obtaining the updated attribute data is increased.

In various embodiments, the banner image 610 can be tagged with a time stamp indicating the time at which the image is captured. Using the tagged information, the communication device 340 may determine the attributes of the media item 312 using the banner image 610 by identifying and processing the one or more banner images 610 having the time stamp during which the media item was provided by the television receiver 320.

FIG. 12 illustrates capturing of the banner images 610 according to one embodiment. After the television receiver 320 is turned on, the television receiver 320 starts playing the media item A. After the media item A starts playing, the banner information 620 appears on the image 610 during time t1. The banner information 620 may appear automatically on the image 610 or in response to commands 316 from the place-shifting device 310 requesting the display of the banner image 610. During the time t1, the place-shifting device 310 captures the banner image B1 and buffers the banner image B1 in the banner buffer 660. Specifically, the banner processor module 556 of the place-shifting device 310 captures the banner image B1, processes the banner image B1, and then sends the processed banner image B1 to the communication device 340 over the network 330 for temporarily storing in the banner buffer 860.

In the example of FIG. 12, the user changes the channel 311 of the television receiver 320 either by operating a remote control unit of the television receiver 320 or by sending commands 316 via the communication device 340 and the place-shifting device 310. In response, a sequence of black screens or frozen screens is generated by the television receiver 320 (illustrated as a thick black line between the media item A and the media item B in FIG. 12). The place-shifting device 310 detects the transition in the media item by listening to the commands 316 from the communication device 340 and by detecting changes in the video screen, as described above in detail with reference to FIG. 10.

After the transition to the media item B, the television receiver 320 provides the banner image B3 during time t3. During time t3, the banner image B3 is captured and sent to the communication device 340 along with other attribute data.

In the example of FIG. 12, the banner images 610 and other attribute data are also captured periodically by the place-shifting device 310. After the banner image B1 is captured at the time t1, a subsequent banner image B2 is captured at the time t2 (after elapse of time from the time t1) even though transition in the media item 312 is not detected. Likewise, at time t4, t5, t6, t7, and t8, the banner images B4, B5, B6, B7, and B8 (not shown in FIG. 12) are generated by the television receiver 320, and captured, processed, and sent to the communication device 340 via the network 330. At these times, other attribute data are also captured and sent to the communication device 340. Periodically obtaining the banner images B4, B5, B6, B7, and B8 serves as a safeguard against transition to a new media item 312 without any events detectable by the transition detect module 552.

In one embodiment, the period for capturing the banner image 610 is adjusted dynamically. In another embodiment, the period for forcing and capturing the banner image 610 is fixed (e.g., every ten minutes).

In one embodiment, other attribute data is relayed to the communication device 340 regardless of the detection of the transition in the media item 312. The attribute data may be monitored by the communication device 340 to determine the transition of the media item 312.

In one or more embodiments where the high resolution banner images are transmitted over the network 330, the condition and bandwidth of the network 330 may be detected to decide whether the banner images 610 should be transmitted in the same channel as the datastream for the media item. If the bandwidth of the network 330 is sufficient to transmit sufficiently high resolution and high quality images of the media item, then the place-shifting device 310 identifies the banner images 610 by tagging. In this way, the banner image 610 is transmitted to the communication device 340 "in-band", i.e., in the same datastream as the media item 312.

In contrast, if the bandwidth of the network 330 is insufficient to transmit sufficiently high resolution and high quality images of the media item, then the banner image 610 is captured in the place-shifting device 310 and processed separately from the main datastream of the media item 312 and transmitted as an additional datastream to the communication device 340. In this case, the banner image 610 is transmitted "out-of-band" to the communication device 340. Such out-of-band transmission of the banner image 610 insures that the banner images 610 received at the communication device 340 are of sufficient resolution and quality for text data extraction while not interfering with the transmission of the media item datastream. In one embodiment, the resolution of 640×480 pixels is considered sufficiently high resolution and quality.

During the out-of-band transmission of the banner image 610, priority is given to the datastream of the media item 312. In one example, no more than 10% or so of the total capacity of the network 330 is allocated to the banner image 610. In such case, the banner image 610 may be trickled to the communication device 340 over a period of time. In other words, the datastream of the media item 312 is sent over the network 330 in a main channel with minimum latency in order to allow real time access to the media item at the communication device 340. In contrast, the banner images 610 are sent to the communication device 340 in an out-of-band (OOB) channel separate from the main channel having greater tolerance for latency.

The banner images 610 need not be sent to the media device 140 in real-time because the time at which the banner image 610 is received at the communication device 340 is not necessarily time-sensitive.

In one embodiment, the banner images 610 are transmitted to the communication device 340 using the bandwidth of the network 330 available after transmitting the datastream of the media item 312. The banner images 610 can be packetized into multiple packets. The number of packets for the banner images 610 is restricted so that the packets for the datastream of the media item 312 are delivered to the communication device 340 without significant latency. The network condition detector 560 may detect the condition of the network 330 and control the transmission rate for the packets of the banner images 610 accordingly.

Figure 13:
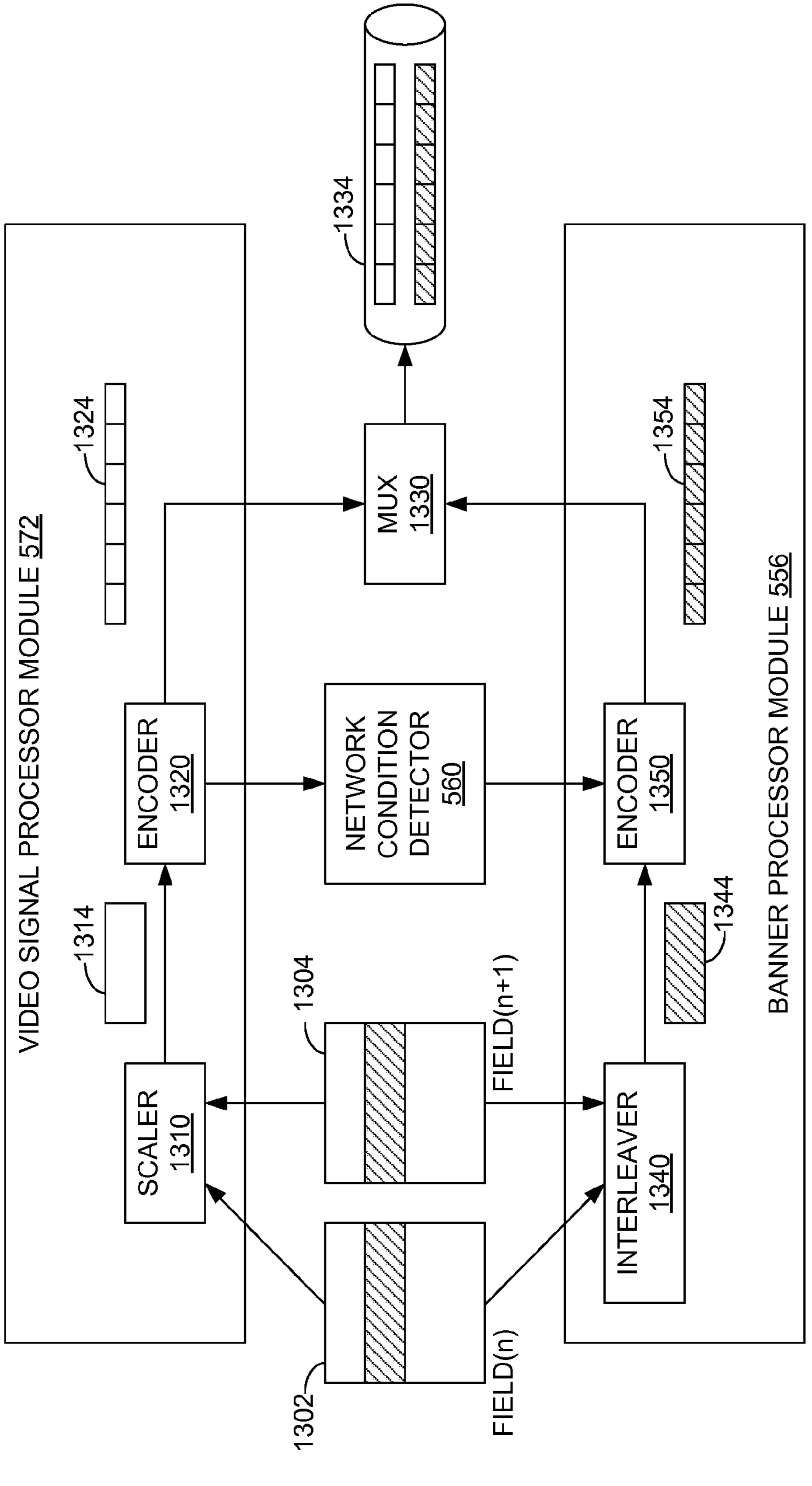
FIG. 13 is a diagram illustrating a process for transmitting banner images according to an embodiment of the invention.

FIG. 13 is a diagram illustrating the process of transmitting the banner image 610 in the OOB channel, according to one embodiment. In this example, the video signal processor module 572 of the place-shifting device 310 includes, among other components, a scaler 1310 and a first encoder 1320. The banner processor module 556 of the place-shifting device 310 includes, among other components, an interleaver 1340 and a second encoder 1350. In this example, the television receiver 320 provides interlaced video images including data for field (n) 1302 and field(n+1) 1304. Field(n) 1302 includes odd lines of a video frame, and field(n+1) 1304 includes even lines of the video frame.

Both fields 1302, 1304 can be fed to the scaler 1310 and converted to a frame 1314 scaled to have resolution lower than the original frame consisting of fields 1302, 1304. The converted frame 1314 is then fed to the first encoder 1320 to generate a datastream 1324. The datastream 1324 is then fed to the multiplexer 1330 as appropriate.

In one embodiment, the fields 1302, 1304 are also fed to the interleaver 1340 of the banner processor module 556. The interleaver 1340 determines the portion of the banner image 610 including the banner information 620 (shown as hashed boxes in the fields 1302 and 1304). The interleaver 1340 extracts the portion of the fields 1302, 1304 including the banner information 620, interleaves lines from both fields 1302, 1304, and generates a banner image 1344 in high resolution. The banner image 1344 is then fed to the second encoder 1350 which converts the banner image 1344 into packets 1354. In one embodiment, the banner image 1344 is not scaled down to a lower resolution in the banner processor module 556.

The second encoder 1350 receives commands from the network condition detector 560 so that the amount of the banner image packets 1354 from the second encoder 1350 does not delay the transmission of the media item datastream packets 1324. To determine the bandwidths available to transmit the packets for the banner image 610, the network condition detector 560 receives information from the first encoder 1320 indicating the amount of data the first encoder 1320 will be sent over the network 330. The packets of the datastream 1324 and the packets of the banner image 1354 are both fed into a multiplexer 1330. The multiplexer 1330 combines the datastream packets 1324 and the banner image packets 1354 for transmission over a communication line 1334 to the network 330. As illustrated in FIG. 13, the packets of the datastream 1324 and the packets of the banner image 1354 are transmitted in two separate channels.

In one embodiment, the attribute data (e.g., XDS data) from other sources is included in either the packets for the datastream of the media item 1324 or the packets for the banner image 1354. Alternatively, the attribute from other sources may be transmitted to the communication device 340 in a channel separate from the main channel for the datastream packets 1324 and the OOB channel for the banner image packets 1354.

Different combinations of functionality and modules may be included in the components of the television content system 300. For example, components of the place-shifting device 310 such as the transition detect module 552 may be implemented on the communication device 340. In this example, the communication device 340 may send a command 316 to the place-shifting device 310 to force and capture the banner image 610 via the network 330 upon detecting the transition of the media item 312.

Also, the entirety of a function implemented by a component of the television content system 300 may be incorporated into other components of the television content system 300. For example, the VOCR server 360 may be incorporated into the communication device 340 or the communication node 350.

In one embodiment, the communication node 350 further includes a server for verifying whether distribution of the media item 312 is restricted for any reason (e.g., copyright protection) using the identity or attributes of the media item 312 as determined by the communication device 340. If the distribution of the media item is illegal or otherwise not permitted, the communication node 350 or another device may decline to store the media item 312.

Figure 14A:
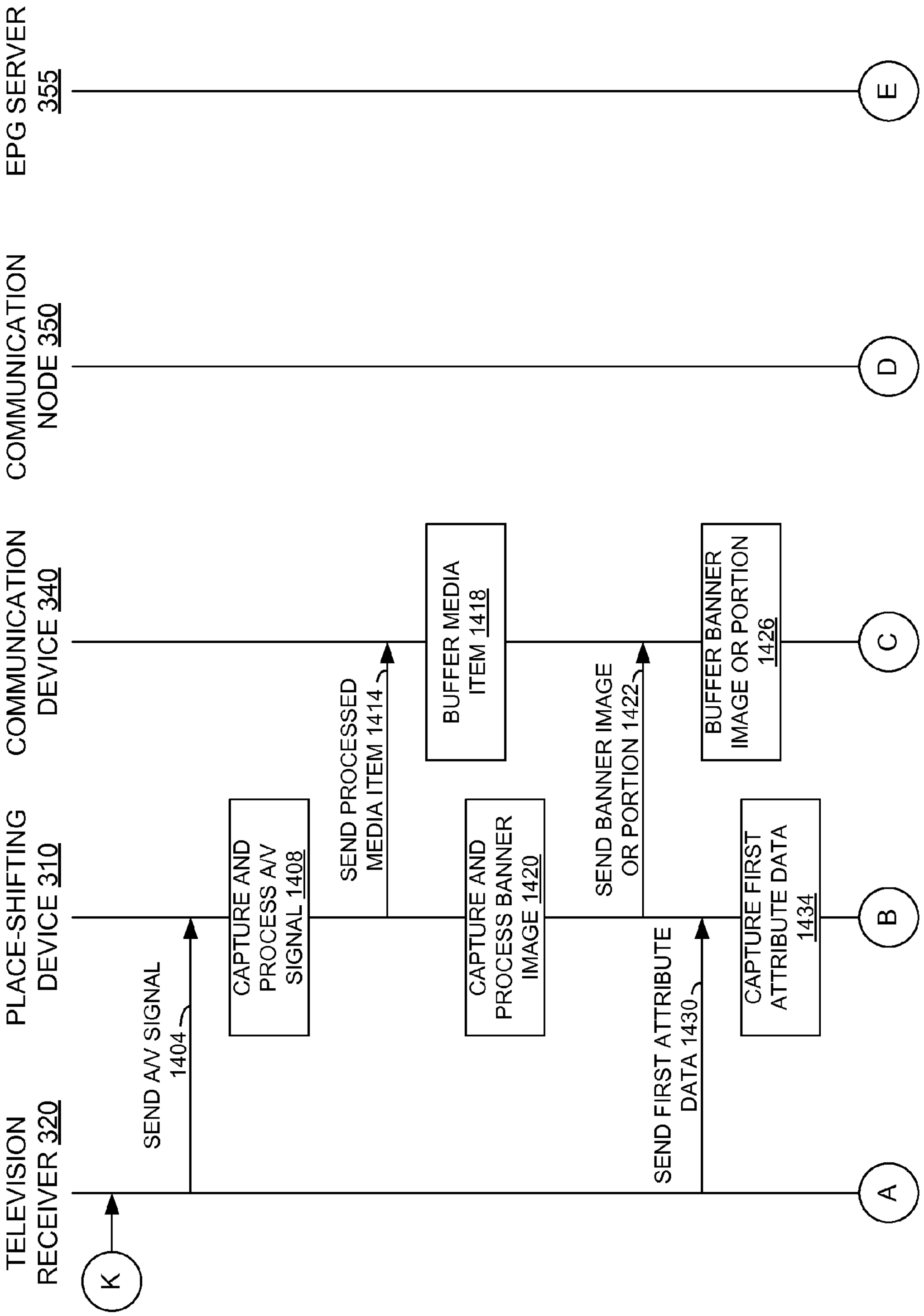
FIGS. 14A-14C depict a flow diagram of a method according to an embodiment of the invention for determining whether received media content is live or recorded.
Figure 14B:
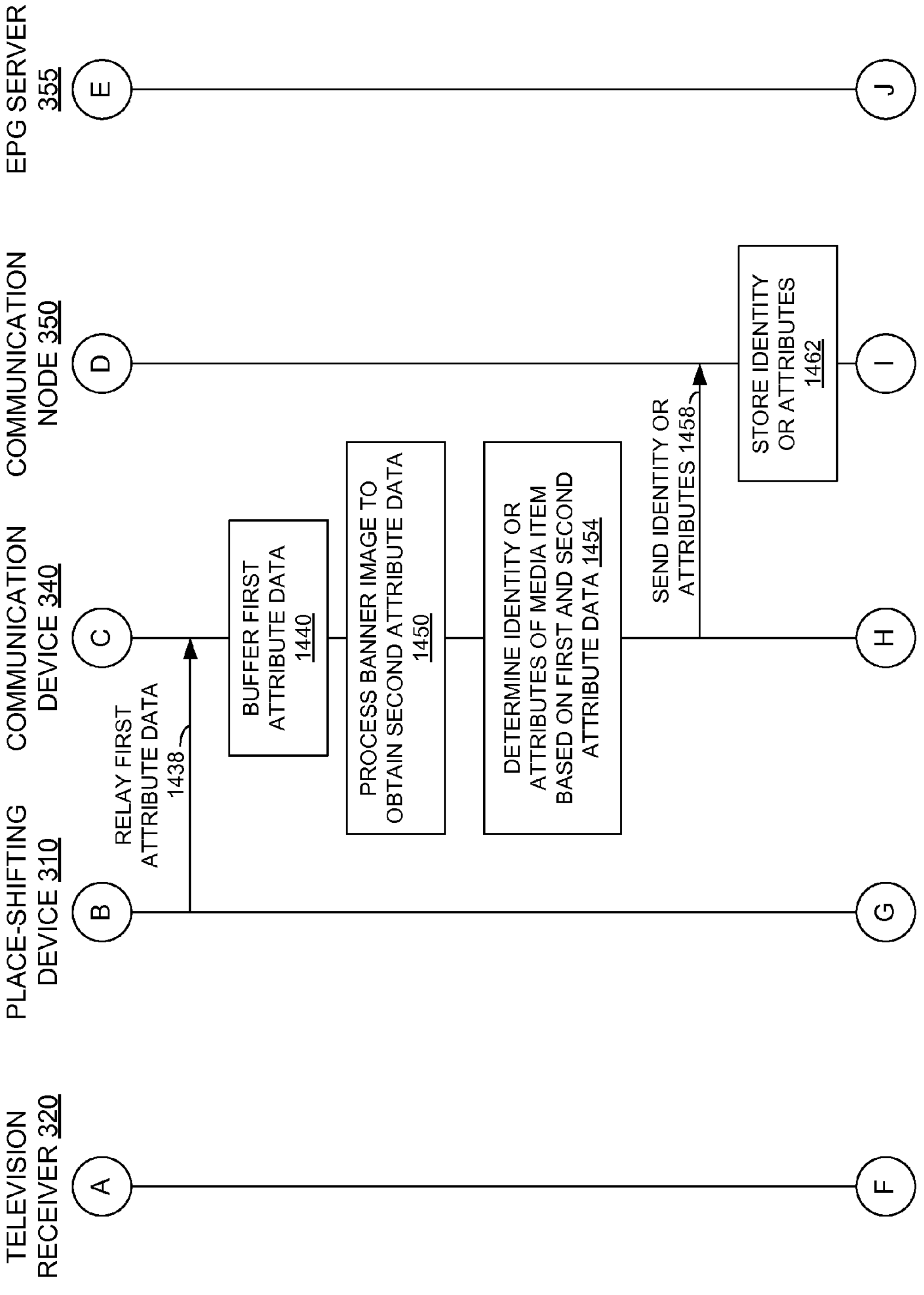
Figure 14C:
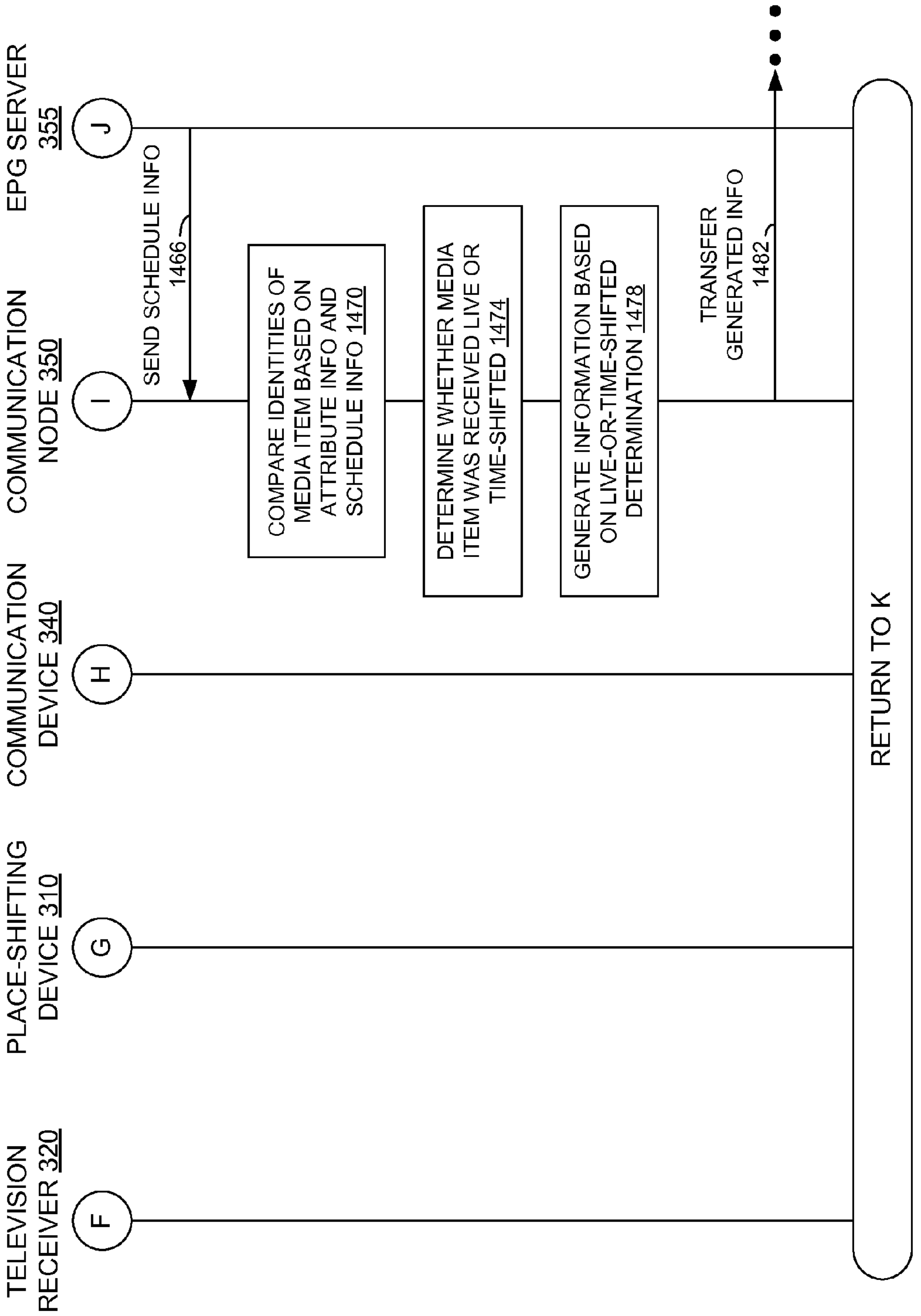

FIGS. 14A to 14C (collectively, FIG. 14) are flowcharts illustrating an exemplary method of determining the identity or attributes of the received media content 312, and whether that content 312 was received live or not at the communication device 340, according to one embodiment. According to FIG. 14, the television receiver 320 first sends the A/V signals containing the selected media content 312 to the place-shifting device 310 (operation 1404). The place-shifting device 310 then captures and processes the A/V signal for transmission over the network 330 (operation 1408). The processing of the A/V signal may include, among other operations, scaling of the images in the video sequence to a lower resolution, compressing, encoding, and/or packetizing of the video sequence for transmission over the network 330. By processing the A/V signal, a datastream of the selected media item 312 is generated.

The datastream of the media item 312 is then sent to the communication device 340 (operation 1414). The datastream of the media item 312 may be buffered in the media buffer 850 for selecting, clipping, editing, and/or any other features by the user (operation 1418).

In one embodiment, the place-shifting device 310 copies and separately processes the banner image 610 or a portion of the banner image 610 (operation 1420). In another embodiment, the place-shifting device 310 may tag the banner image 610 or a portion of the banner image 610 for encoding in a higher resolution without copying and separately processing the banner image 610.

The processing (operation 1420) of the banner image 610 may include learning the location and structure of the banner information 620. The place-shifting device 310 may select a portion of the banner image 610 based on the learning of location and structure of the banner information 620. As described above with reference to FIG. 5, the banner image 610 can be processed in high resolution and sent to the communication device 340 over the network 330 (operation 1422). The higher resolution of the banner image 610 allows the text data included in the image 610 to be recognized more accurately by the VOCR server 360 or the communication device 340. After the banner image 610 is received, the communication device 340 buffers the image 610 in the banner buffer 860 (operation 1426), as described above in detail with reference to FIG. 8.

The television receiver 320 also sends first attribute data to the place-shifting device 310 (operation 1430). The first attribute data may include, among others, EPG data, closed caption data, XDS data, and/or the like. The place-shifting device 310 captures the first attribute data (operation 1434). The captured first attribute data is then relayed to the communication device 340 (operation 1438). The first attribute data is buffered in the communication device 340 (operation 1440).

The communication device 340 then determines the identity or attributes of the media item 312 based on the first attribute data and the second attribute data (operation 1454). As described above in detail with reference to FIG. 8, the communication device 340 may reference a database (e.g., the EPG database server 355) to verify or determine the identity or other attributes of the media item 312. After determining the identity or attributes of the selected or edited media item 312, the identity or attributes of the media item are sent to the communication node 350 (operation 1458).

The identity or attributes of the media item 312 are then stored on the communication node 350 (operation 1462). Alternatively, the identity or attributes of the media item 312 can be stored on the communication device 340 instead of being sent to the communication node 350.

In another embodiment, the attributes of the received media content 312 are first determined using the first attribute data. Subsequently, the attributes of the media item 312 are updated and revised using the second attribute data derived from the banner image 610. That is, the communication device 340 may preliminarily determine the identity or the attributes of the media item 312 using the first attribute data, and can update, correct, or revise the identity or the attributes according to the second attribute data if the preliminary identity or attributes is incorrect. This scheme of preliminarily determining the identity or the attributes is advantageous in some embodiments because the media item 312 can be uploaded or stored promptly using the identity or attributes as an index of the media item 312.

In other implementations, either the first or the second attribute data may be unavailable. For example, a banner image 610 may not be available to determine the identify or other attributes of the media item 312. In such cases, the remaining attribute data, such as XDS data, may be utilized to determine the identity of the media content item 312.

In one embodiment, the attributes of the received media content 312 include an identity of the media content 312 and a channel 311 over which the television receiver 320 captured the media content 312 ultimately received at the communication device 340. Further, in some implementations, the attribute information of the content 312 includes an indication of a specific time or time period during which the content 312 was received at the communication device 340. In another example, the communication node 350 may presume that the time period of reception is approximately the current time.

Continuing with FIG. 14, the communication node 350 also receives schedule data, such as from the EPG server 355 of FIG. 3 (operation 1466). In other embodiments, the communication node 350 may receive such data directly from broadcast television sources associated with the channels 311 received at the television receiver 320. More specifically, the communication node 350 receives the identity of the media content listed in the schedule data of the EPG server 355 that is associated with the time period specified in the attribute information received from the communication device 340 (or, alternately, with the current time).

The communication node 350 then compares the identity of the received content 312 as indicated in the attribute information from the communication device 340 with the content identity received from the EPG server 355 (operation 1470). Based on this comparison, the communication node 350 determines whether the content identity from the communication device 340 and the content identity from the EPG server 355 indicate the same content or different content. In one example, the communication node 340 requires an exact match between the content identity from the EPG server 355 and the content identity from the communication device 340 to determine that the same television content is being indicated. In other embodiments, the content identities may differ to a degree while still indicating the same television content.

In one example, the communication node 350 may receive multiple media content identities from the attribute information delivered by the communication device 340. For example, a first identity of the content 312 may be derived from the banner information 620 described above, while a second identity of the content 312 may be generated or extracted from metadata, such as XDS data, from the received media content 312. The multiple media content identities may or may not indicate the same media content. As a result, the comparison operation undertaken by the communication node 350 may be configured to determine which of the multiple media content identities to take into account before comparing the resulting content identity with that provided in the schedule information from the EPG server 355. In another example, the communication node 350 may compare each of the multiple identities from the attribute information to the media content identity from the schedule information, then determining which of the comparisons is valid.

Based on this comparison, the communication node 350 generates a determination as to whether the received content 312 is (or was) received live, or whether the content 312 is (or was) received in a delayed or time-shifted manner at the communication device 340 (operation 1474). One example of the received content 312 being time-shifted is when a user instructs the television receiver 320 to record a program broadcast being transmitted over one of the television channels 311 to the DVR 332, and later instructs the receiver 320 to deliver that program from the DVR 332 of the television receiver 320 via the place-shifting device 310 to the communication device 340. To this end, the communication node 350 considers the received content item 312 as being received live at the communication device 340 if the compared content identities from the attribute information and the schedule information indicate the same television content or program. Oppositely, the communication node 350 considers the received content 312 as being received in a delayed manner if the compared content identities indicate different media content items.

After generating the determination of whether the received content 312 was received in a live or time-shifted manner, the communication node 350 may generate information for directing other operations involving the viewing of media content at the communication device 340 (operation 1478). Such information may then be transferred to another device, such as the communication device 340 or the place-shifting device 310 (operation 1482). In another example, the communication node 350 may transfer the generated indication to another electronic device, such as one coupled with the communication node 350 via the communication network 330 (operation 1482), which may in turn be employed to direct other operations involving the viewing of media content at the communication device 340. Examples of these operations are provided in greater detail below.

Each of the operations 1462-1482 discussed above is depicted in FIG. 14 as involving the communication node 350. In other implementations, another of the components coupled to the communication network 330, such as the communication device 340 and the place-shifting device 310, may perform some or all of these operations 1462-1482 to determine whether particular media content 312 is received live or not at the communication device 340, and to use that determination for other operations. Devices other than those specifically illustrated in FIG. 3 may be configured in a similar manner in other embodiments.

Given the determination of whether the media content 312 is received live at the communication device 340, the communication node 350 may perform various functions on the basis of that determination. In one implementation, the communication node 350 may generate media content recommendations for the user of the communication device 340 based on the received media content 312 and on whether the received content 312 was viewed live or from a recording. For example, the node 350 may determine that content received in a time-shifted manner may rank higher in terms of user interest than programming viewed live since the user has likely recorded only programs of the highest interest to the user. Thus, subsequent viewing recommendations made by the communication node 350 may tend to more highly recommend programming or content similar to time-shifted programs over those viewed live.

In another implementation, the communication node 350 may control the ability of the communication device 350 to retransmit or record the received media content 312 based on the live-versus-time-shifted determination. For example, if the received content 312 was time-shifted, indicating the content 312 was viewed from a recording residing in the DVR 332 of the television receiver 320, ownership rights involving the received content 312 may prohibit any further storage on, or subsequent transfer from, the communication device 340. Oppositely, reception of live content 312 at the communication device 340 may indicate that storage on the device 340, and/or transfer therefrom, of the content 312 may be permissible.

In another embodiment, the communication node 350 may employ the live-or-not determination to adjust subsequent content transfers to the communication device 340. For example, while transfers of live media content from the television receiver 320 via the place-shifting device 310 to the communication device 340 may not be controllable due to their live nature, those transferred in a time-shifted manner from the DVR 332 of the television receiver 320 may be controlled more readily. As a result, the communication node 350 may receive transmission performance or reception performance information regarding the received content 312, and generate transfer instructions to the television receiver 320 and/or the communication device 340 if the media content 312 was received in a time-shifted manner. These transfer instructions may pertain to the media content 312 stored at the DVR 332, or to other media content to be transferred from the DVR 332 to the communication device 340. Such instructions may affect various aspects of the subsequent transfer such as the number of frames between I-frames of an MPEG video stream, video and/or audio quantization rates, overall bit rates, and so on.

Further, the communication node 350 may use the live-versus-time-shifted determination to organize performance information according to that determination. For example, the node 350 may receive performance information from the communication device 340 indicating how often and over how much content 312 the user skipped or fast-forwarded. Organizing this information according to whether the program was received live or not may help advertisers determine the viewership of commercials interspersed throughout the content 312. Other data, such as total viewing time, may be similarly quantified, thus providing insight into the effectiveness of the commercials, or even the received content 312 itself.

While several uses of the determination as to whether the received content 312 was viewed live or not are discussed above, other applications not specifically mentioned herein are also contemplated.

Figure 15:
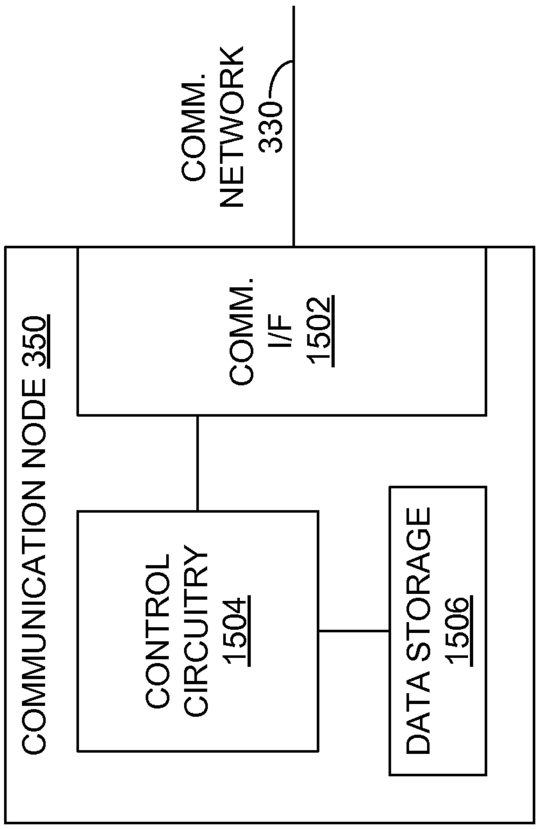
FIG. 15 is a block diagram of the communication device of the television content system of FIG. 3 according to an embodiment of the invention.

An example of the communication node 350 of FIG. 3 is illustrated in the block diagram of FIG. 15. In that example, the communication node 350 includes a communication interface 1502, control circuitry 1504, and data storage 1506. Other components, including, but not limited to, a power supply and a user interface, may also be included in the communication node 350, but such components are not explicitly shown in FIG. 15 nor described further below to simplify the following discussion.

The communication interface 1502 is configured to receive via the communication network 330 the attribute information and schedule information involving the media content 312 received at the communication device 340, and to possibly transmit a determination of whether the content 312 was received live. The communication interface 1502 may be a WAN interface, such as an interface to communicate via the Internet, although other interfaces, such as a LAN interface or a wireless network adapter, may be employed in other arrangements. Specific examples of the communication interface 1502 include, but are not limited to, a cable or DSL interface, a Wi-Fi interface, and a cellular communication network interface.

The data storage 1506 is configured to store the received attribute and schedule information, as well as possibly the determination of whether the media content 312 was received live at the communication device 340. The data storage 1506 may be any data storage capable of storing digital data, including volatile data storage, such as dynamic random-access memory (DRAM) or static random-access memory (SRAM), nonvolatile data storage, such as flash memory, magnetic disk drives, and optical disk drives, or combinations thereof.

The control circuitry 1504 of the node 350 is communicatively coupled with the communication interface 1502 and the data storage 1506 to perform the determination functions more particularly described above. In one example, the control circuitry 1504 may include one or more processors, such as microprocessors, microcontrollers, or digital signal processors (DSPs), configured to execute instructions designed to control the various components of the node 350. These instructions may be stored in the data storage 1506 or another data storage or memory unit not specifically depicted in FIG. 15. In another implementation, the control circuitry 1504 may be composed of hardware circuitry not requiring software instructions, or of some combination of hardware and software elements.

In summary, at least some embodiments as described herein provide a system and method to determine whether a remote communication device receives media content as broadcast live or in a time-shifted manner, such as from a recording. Such information, while ordinarily difficult to determine, may be subsequently employed to perform such diverse operations as control of content transmission, presentation of programming recommendations, enforcement of content ownership rights, and organization of transmission and reception performance data.

While several embodiments of the invention have been discussed herein, other implementations encompassed by the scope of the invention are possible. For example, while specific examples discussed above focus primarily on audio/video media content, other types of content, such as radio content, textual content, and the like, may serve as the focus of other implementations. Further, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method executable by a computing device to determine whether media content received at a specific time is live media content or time-shifted media content, the method comprising:

receiving attribute information concerning the media content at the computing device, wherein the attribute information identifies the media content;

comparing the attribute information identifying the media content with schedule information describing programs broadcast at the specific time, wherein the comparing is performed by the computing device;

determining, using the computing device, that the received media content is live media content if the attribute information identifying the media content corresponds to a program described in the schedule information that is broadcast at the specific time; and determining, using the computing device, that the received media content is time-shifted media content if the attribute information identifying the media content does not correspond to a program described in the schedule information that is broadcast at the specific time.

2. The method of claim 1, wherein the media content is received at a remote communication device that communicates with the computing device via a network.

3. The method of claim 1, wherein the media content is received at the computing device from a content place-shifting device.

4. The method of claim 1, wherein the attribute information identifies a channel that carries the media content.

5. The method of claim 4, wherein the comparing comprises comparing the identified media content to a program identified in the schedule information as being broadcast on the channel at the specific time.

6. The method of claim 1, wherein the attribute information originates from the received media content.

7. The method of claim 1, wherein the specific time comprises a current time.

8. The method of claim 1, wherein the attribute information comprises textual information displayed in visual information of the received media content, wherein the textual information is generated via optical character recognition.

9. The method of claim 1, wherein the attribute information comprises metadata accompanying the received media content.

10. The method of claim 1, wherein the attribute information comprises more than one version of the identity of the received media content, and wherein the method further comprises comparing the more than one version of the identity of the received media content to determine the identity of the received media content from the attribute information.

11. The method of claim 1, wherein the attribute information is derived from optical character recognition of textual data contained within the media content received at a communication device.

12. The method of claim 11, wherein the attribute information is received at the computing device from the communication device via a network.

13. The method of claim 11 wherein the attribute information is derived at the computing device based upon data received from the communication device via the network.

14. The method of claim 1, further comprising:

generating media content recommendations at the computing device based on an identity of the received media content and on the determination of whether the received media content is live media content or time-shifted media content; and transmitting the media content recommendations from the computing device to a communication device that receives the media content.

15. The method of claim 1, further comprising:

controlling at least one of retransmission and storage of the received media content at the communication device based on whether the received media content is live media content or time-shifted media content.

16. A computing device comprising:

a communication interface configured to receive attribute information concerning media content received at a specific time, wherein the attribute information is derived from received media content, and wherein the attribute information identifies the received media content; and control circuitry configured to compare the identity of the attribute information with schedule information describing broadcast programming to thereby determine that the received media content is live media content if the attribute information corresponds to a program identified in the schedule information that is broadcast at the specific time, and to determine that the received media content is time-shifted media content if the attribute information does not correspond to the program identified in the schedule information that is broadcast at the specific time.

17. The computing device of claim 16, wherein the specific time comprises a current time.

18. The computing device of claim 16, wherein the attribute information is obtained from optical character recognition of textual information displayed in a visual portion of the received media content.

19. The computing device of claim 16 wherein the communication interface is configured to receive the attribute information with the media content, and wherein the computing device is further configured to render the media content for playback to a viewer.

20. The computing device of claim 16 wherein the attribute information comprises an identification of a channel that carries the media content, and wherein the control circuitry compares the identified media content to a program identified in the schedule information as being broadcast on the channel at the specific time.

* * * * *